US012187037B2

(12) United States Patent
Matsuo et al.

(10) Patent No.: US 12,187,037 B2
(45) Date of Patent: Jan. 7, 2025

(54) LIQUID EJECTING APPARATUS AND LIQUID EJECTING HEAD

(71) Applicant: SEIKO EPSON CORPORATION, Tokyo (JP)

(72) Inventors: Kenichiro Matsuo, Matsumoto (JP); Kei Yamaguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 17/823,331

(22) Filed: Aug. 30, 2022

(65) Prior Publication Data

US 2023/0068232 A1 Mar. 2, 2023

(30) Foreign Application Priority Data

Aug. 31, 2021 (JP) ................................ 2021-140980
Jul. 8, 2022 (JP) ................................ 2022-110254

(51) Int. Cl.
*B41J 2/14* (2006.01)
*B41J 2/145* (2006.01)

(52) U.S. Cl.
CPC .................................... *B41J 2/145* (2013.01)

(58) Field of Classification Search
CPC ........................................................ B41J 2/145
See application file for complete search history.

(56) References Cited

U.S. PATENT DOCUMENTS

2014/0043394 A1 2/2014 Ishikawa et al.
2018/0236791 A1* 8/2018 Ohashi ..................... B41J 2/155
2018/0244071 A1* 8/2018 Fujimoto ............... B41J 2/2132
2020/0108613 A1* 4/2020 Tsuji .................... B41J 2/16588

FOREIGN PATENT DOCUMENTS

JP 2014-034170 A 2/2014

* cited by examiner

*Primary Examiner* — Jason S Uhlenhake
(74) *Attorney, Agent, or Firm* — WORKMAN NYDEGGER

(57) ABSTRACT

A liquid ejecting apparatus includes a liquid ejecting head that has an ejection surface including a first nozzle row configured to eject a first ink and a second nozzle row configured to eject a second ink. The liquid ejecting head is configured to be held in a first posture in which the ejection surface is inclined with respect to a horizontal plane. A dynamic surface tension of the second ink is higher than a dynamic surface tension of the first ink. In the first posture, the first nozzle row is positioned above the second nozzle row with respect to a gravity direction.

19 Claims, 19 Drawing Sheets

FIG. 12

| TYPE OF INK | FIRST INK | SECOND INK | THIRD INK | FOURTH INK |
|---|---|---|---|---|
| PIGMENT DISPERSION LIQUID 1 (%) | 35.0 | | | |
| PIGMENT DISPERSION LIQUID 2 (%) | | 30.0 | | |
| PIGMENT DISPERSION LIQUID 3 (%) | | | | 30.0 |
| PIGMENT DISPERSION LIQUID 4 (%) | | | 30.0 | |
| GLYCERIN (%) | | 12.0 | 12.0 | 12.0 |
| TRITYL PROPANE (%) | 10.0 | 10.0 | 10.0 | 10.0 |
| 1, 2-HEXANEDIOL (%) | 1.0 | 3.0 | 4.0 | 1.0 |
| 1-PENTANOL (%) | 12.0 | | | |
| ACETYLENOL E100 (%) | 1.0 | | 0.2 | |
| ACETYLENOL E60 (%) | 1.7 | 0.4 | 1.3 | 0.9 |
| ION-EXCHANGED WATER (%) | 39.3 | 44.6 | 42.5 | 46.1 |
| DYNAMIC SURFACE TENSION $\gamma$ (mN/m) | 29.0 | 41.0 | 32.0 | 40.0 |
| | CYAN | BLACK | MAGENTA | YELLOW |

LIQUID EJECTING APPARATUS AND LIQUID EJECTING HEAD

The present application is based on, and claims priority from JP Application Serial Number 2021-140980, filed Aug. 31, 2021 and JP Application Serial Number 2022-110254, filed Jul. 8, 2022, the disclosures of which are hereby incorporated by reference herein in their entirety.

BACKGROUND

1. Technical Field

The present disclosure relates to a liquid ejecting apparatus and a liquid ejecting head.

2. Related Art

In a recording head that ejects a plurality of types of inks, an ejection surface for ejecting an ink is inclined with respect to a horizontal plane in some cases (for example, see JP-A-2014-34170).

The dynamic surface tension of an ink differs for each type of ink in some cases. In the related art, a relationship of a combination of an effect of different dynamic surface tensions of the plurality of inks and an effect of a case where the ejection surface is inclined has not been considered.

SUMMARY

According to an aspect of the present disclosure, there is provided a liquid ejecting apparatus including a liquid ejecting head that has an ejection surface including a first nozzle row for ejecting a first ink and a second nozzle row for ejecting a second ink, in which the liquid ejecting head is configured to be held in a first posture in which the ejection surface is inclined with respect to a horizontal plane. A dynamic surface tension of the second ink is higher than a dynamic surface tension of the first ink. In the first posture, the first nozzle row is positioned above the second nozzle row in a gravity direction.

According to another aspect of the present disclosure, there is provided a liquid ejecting apparatus including a first liquid ejecting head that has a first ejection surface including a first nozzle which ejects a first ink and a second liquid ejecting head that has a second ejection surface including a second nozzle which ejects a second ink. A dynamic surface tension of the second ink is higher than a dynamic surface tension of the first ink. The first ejection surface is disposed such that an angle formed by an ejection direction of the first ink ejected from the first nozzle and a gravity direction is a first angle. The second ejection surface is disposed such that an angle formed by an ejection direction of the second ink ejected from the second nozzle and the gravity direction is a second angle larger than the first angle.

According to still another aspect of the present disclosure, there is provided a liquid ejecting head including a first nozzle row that is used for ejecting a first ink, a second nozzle row that is used for ejecting a second ink, and a third nozzle row that is used for ejecting a third ink. A dynamic surface tension of the third ink is higher than a dynamic surface tension of the first ink and is lower than a dynamic surface tension of the second ink. The third nozzle row is positioned between the first nozzle row and the second nozzle row in a gravity direction.

BRIEF DESCRIPTION OF THE DRAWINGS

FIG. 12 is a table showing components of an ink.

DESCRIPTION OF EXEMPLARY EMBODIMENTS

Hereinafter, embodiments for carrying out the present disclosure will be described with reference to the drawings. However, in each drawing, the dimensions and scale of each portion are different from the actual dimensions and scale as appropriate. In addition, since the embodiments to be described below are suitable specific examples of the present disclosure, various technically preferable limitations are attached, but the scope of the present disclosure is not limited to the forms unless stated otherwise to limit the present disclosure in the following description.

In the following description, three directions intersecting each other will be described as an X-axis direction, a Y-axis direction, and a Z-axis direction in some cases. The X-axis direction includes an X1 direction and an X2 direction which are directions opposite to each other. The X-axis direction is an example of a first direction. The Y-axis direction includes a Y1 direction and a Y2 direction which are directions opposite to each other. The Y-axis direction is an example of a second direction. The Z-axis direction includes a Z1 direction and a Z2 direction which are directions opposite to each other. The X-axis direction, the Y-axis direction, and the Z-axis direction are orthogonal to each other. The X-axis direction, the Y-axis direction, and the Z-axis direction are directions having an ejection surface F1 to be described later as reference.

In addition, a downward direction of a gravity direction will be described as a gravity direction G1, and a direction orthogonal to both of the gravity direction G1 and the X-axis direction will be described as a K-axis direction. In addition, an opposite direction to the gravity direction G1 will be defined as an upward direction G2. The K-axis direction includes a K1 direction and a K2 direction which are directions opposite to each other. The K-axis direction is an example of a third direction. The K-axis direction is an example of a horizontal direction. The horizontal direction is a direction orthogonal to the gravity direction G1. The third direction is a direction orthogonal to both of the first direction and the gravity direction G1.

Figure 1:
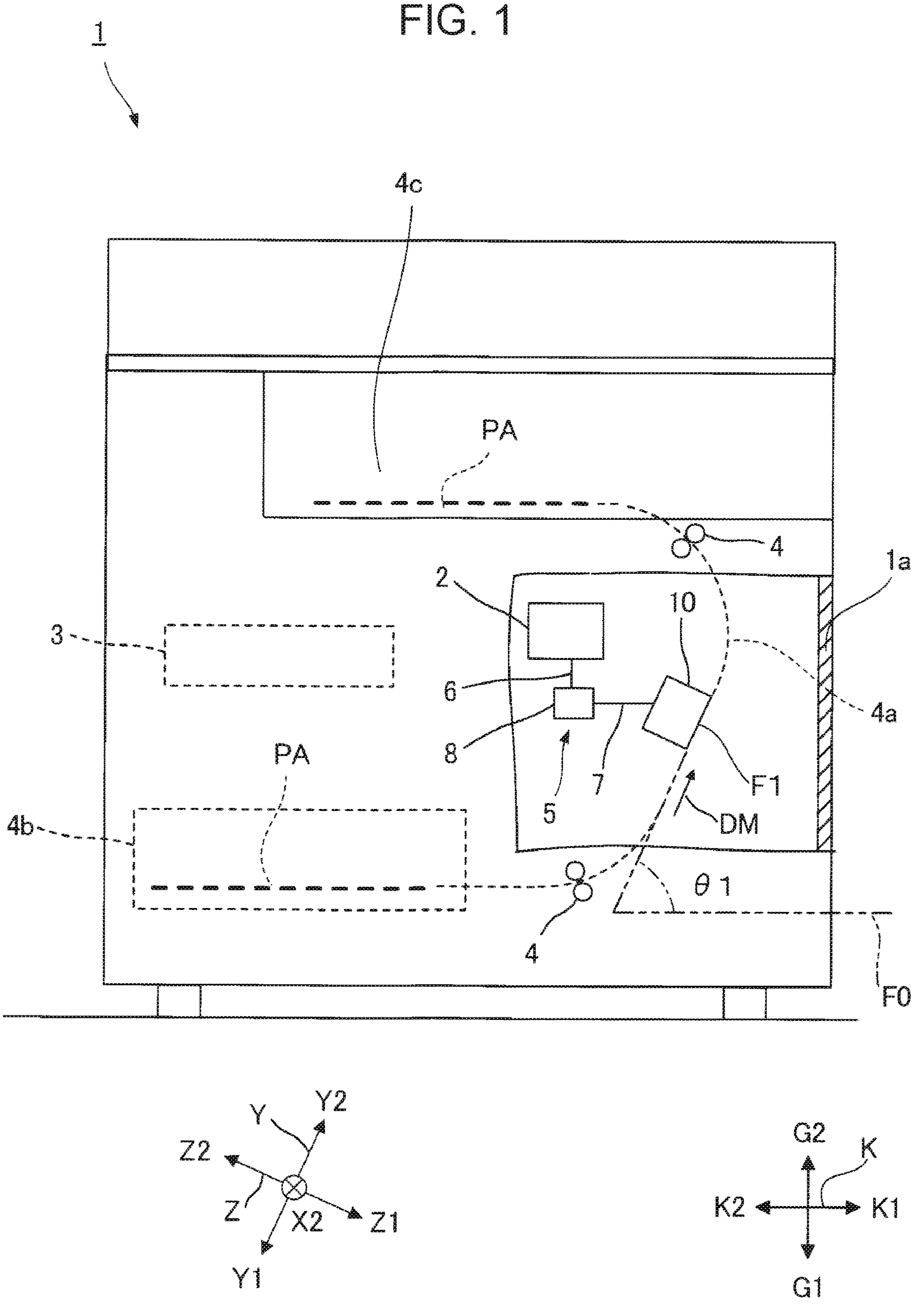
FIG. 1 is a schematic view showing a liquid ejecting apparatus according to a first embodiment.
Figure 2:
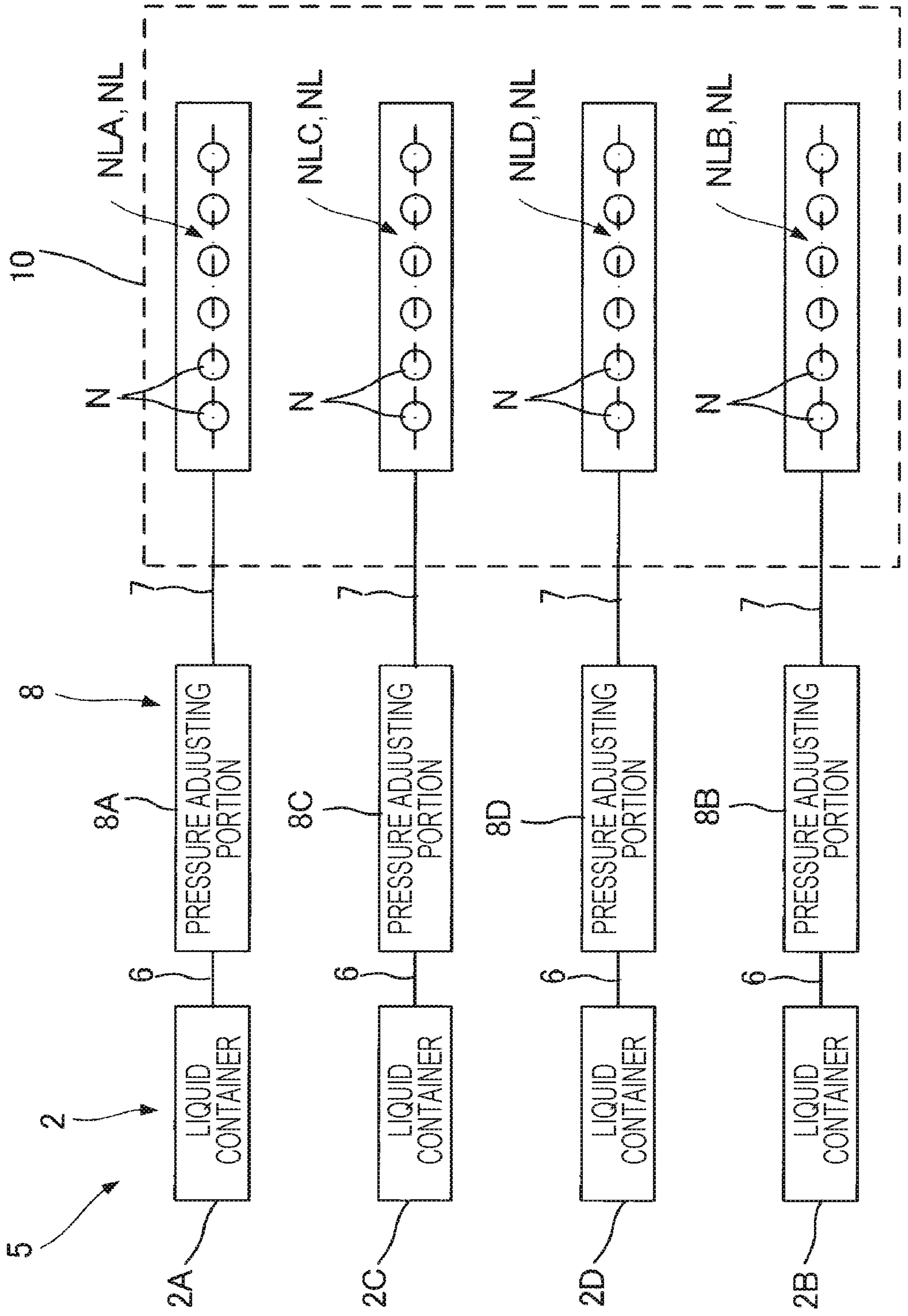
FIG. 2 is a block diagram showing an ink flow path.

FIG. 1 is a schematic view showing a liquid ejecting apparatus 1 according to a first embodiment. FIG. 2 is a block diagram showing an ink flow path. The liquid ejecting apparatus 1 is an ink jet type printing apparatus that ejects an ink, which is an example of a "liquid", to a medium PA as droplets. The liquid ejecting apparatus 1 is a so-called line type printing apparatus in which a plurality of nozzles ejecting an ink are distributed over the entire range in a width direction of the medium PA. The medium PA is typically printing paper. The medium PA is not limited to the printing paper and may be, for example, a printing target made of any material such as a resin film and cloth.

The liquid ejecting apparatus 1 includes a liquid ejecting head 10 that has the ejection surface F1 inclined with respect to a horizontal plane F0. The liquid ejecting apparatus 1 includes a plurality of liquid containers 2, a control unit 3, a medium transporting mechanism 4, an ink supply unit 5, and the liquid ejecting head 10. The liquid ejecting apparatus 1 may include one liquid ejecting head 10 or may include a plurality of liquid ejecting heads 10. The liquid ejecting apparatus 1 of the present embodiment includes one liquid ejecting head 10. When the plurality of liquid ejecting heads 10 are included, the plurality of liquid ejecting heads 10 are arranged in the X-axis direction to configure a line head.

The control unit 3 controls an operation of each element of the liquid ejecting apparatus 1. The control unit 3 includes, for example, a processing circuit such as a CPU and an FPGA and a storage circuit such as a semiconductor memory. The storage circuit stores various types of programs and various types of data. The processing circuit realizes various types of control by executing the program and using the data as appropriate. The CPU is an abbreviation for a central processing unit. The FPGA is an abbreviation for a field programmable gate array.

The medium transporting mechanism 4 is controlled by the control unit 3 and transports the medium PA in a transport direction DM. The transport direction DM is a transport direction of the medium PA at a position facing the ejection surface F1 and is parallel to or substantially parallel to the Y-axis direction. The medium transporting mechanism 4 includes a transport roller that is long along the width direction of the medium PA and a motor that rotates the transport roller. The medium transporting mechanism 4 is not limited to the configuration using the transport roller and may have, for example, a configuration using a drum or an endless belt that transports the medium PA in a state where the medium PA is adsorbed to an outer peripheral surface because of an electrostatic force.

A medium transport path 4*a* through which the medium PA is transported is formed in the liquid ejecting apparatus 1. The medium transport path 4*a* is a path from a feeding portion 4*b* to a discharging portion 4*c*. The medium transporting mechanism 4 transports the medium PA along the medium transport path 4*a*. The feeding portion 4*b* and the discharging portion 4*c* include a tray capable of storing the medium PA.

The liquid container 2 stores an ink. Examples of a specific embodiment of the liquid container 2 include a cartridge that can be attached/detached with respect to the liquid ejecting apparatus 1, a bag-shaped ink pack formed of a flexible film, and an ink tank that can be refilled with an ink. A type of ink to be stored in the liquid container 2 can be any type.

The liquid container 2 includes liquid containers 2A, 2B, 2C, and 2D. The liquid container 2A stores a first ink. The liquid container 2B stores a second ink. The liquid container 2C stores a third ink. The liquid container 2D stores a fourth ink. For example, the first ink, the second ink, the third ink, and the fourth ink are inks having colors different from each other. The first ink, the second ink, the third ink, and the fourth ink have dynamic surface tensions different from each other. The dynamic surface tension of the second ink is higher than the dynamic surface tension of the first ink. The dynamic surface tension of the third ink is higher than the dynamic surface tension of the first ink and is lower than the dynamic surface tension of the second ink. The dynamic surface tension of the fourth ink is lower than the dynamic surface tension of the second ink and is higher than the dynamic surface tension of the third ink. A component for each type of ink and measurement of a dynamic surface tension will be described later.

A difference between the dynamic surface tension of the first ink and the dynamic surface tension of the second ink is 1.0 mN/m or larger. When a lifetime is set to 10 msec in measurement of a dynamic surface tension to be described later, the dynamic surface tension of the first ink is lower than the dynamic surface tension of the second ink. When the lifetime is set to 10 msec, the dynamic surface tension of the second ink is higher than that of the fourth ink, the dynamic surface tension of the fourth ink is higher than that of the third ink, and the dynamic surface tension of the third ink is higher than that of the first ink.

The ink supply unit 5 has ink flow paths 6 and 7, through which an ink is supplied from the liquid containers 2 to the liquid ejecting head 10, and a pressure adjusting portion 8 that adjusts the pressure of an ink in the liquid ejecting head 10. The ink flow path 6 includes a flow path from the liquid containers 2 to the pressure adjusting portion 8. The ink flow path 7 includes a flow path from the pressure adjusting portion 8 to the liquid ejecting head 10. The ink flow path 7 includes a flow path formed in the liquid ejecting head 10. The ink flow paths 6 and 7 are formed by, for example, a pipe and a tube. The ink flow paths 6 and 7 include, for example, a flow path member, a pipe, and a tube in which a groove, a recessed portion, or a through-hole is formed.

The pressure adjusting portion 8 adjusts the pressure of an ink to be supplied to the liquid ejecting head 10 such that a predetermined pressure acts on a nozzle N. In addition, the pressure adjusting portion 8 may adjust the pressure of an ink to be supplied to the liquid ejecting head 10 with a sub-tank that temporarily stores the ink. The pressure adjusting portion 8 may adjust the pressure of an ink in the liquid ejecting head 10 by keeping the stored amount of the ink in the sub-tank constant.

The pressure adjusting portion 8 includes pressure adjusting portions 8A, 8B, 8C, and 8D. The pressure adjusting portion 8A communicates with the liquid container 2A and adjusts the pressure of the first ink. The pressure adjusting portion 8B communicates with the liquid container 2B and adjusts the pressure of the second ink. The pressure adjusting portion 8C communicates with the liquid container 2C and adjusts the pressure of the third ink. The pressure adjusting portion 8D communicates with the liquid container 2D and adjusts the pressure of the fourth ink.

Figure 3:
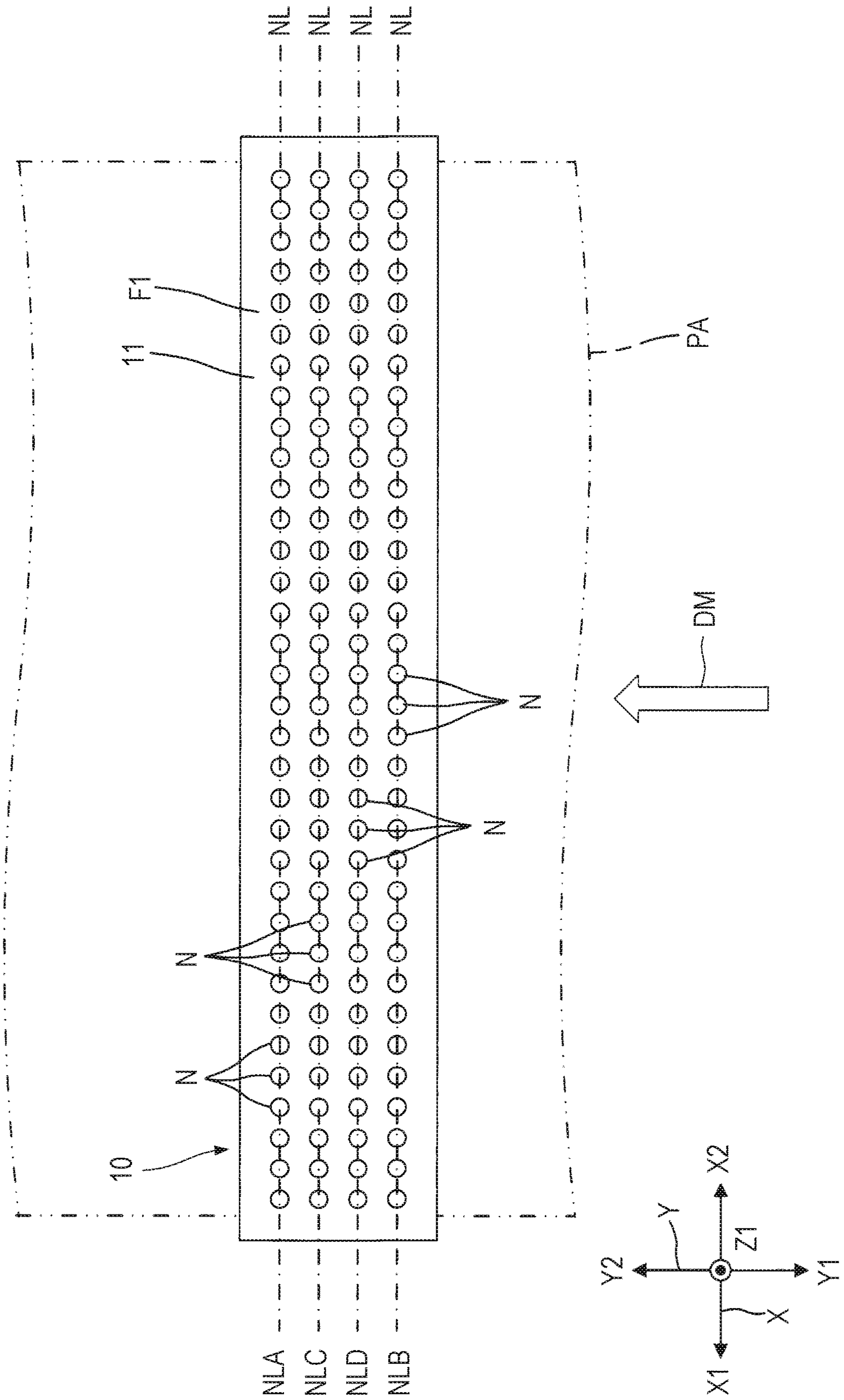
FIG. 3 is a bottom view showing a nozzle plate on which a nozzle row is formed.

FIG. 3 is a bottom view showing a nozzle plate 11 on which a nozzle row NL is formed. The liquid ejecting head 10 includes the nozzle plate 11 having a plurality of nozzle rows NL. The nozzle row NL includes a plurality of nozzles N ejecting an ink. Among surfaces of the nozzle plate 11, a surface facing the medium PA is the ejection surface F1 for ejecting the ink. The plurality of nozzles N are formed in the ejection surface F1. The ejection surface F1 is disposed to be spaced apart from the medium PA.

The plurality of nozzle rows NL include nozzle rows NLA, NLB, NLC, and NLD. The nozzle row NLA includes the plurality of nozzles N ejecting the first ink. The nozzle row NLB includes the plurality of nozzles N ejecting the second ink. The nozzle row NLC includes the plurality of nozzles N ejecting the third ink. The nozzle row NLD includes the plurality of nozzles N ejecting the fourth ink. When not distinguishing between the nozzle rows NLA, NLB, NLC, and NLD, the nozzle rows will be described as the nozzle rows NL in some cases.

The nozzle row NL includes the plurality of nozzles N arranged in the X-axis direction. The nozzle N is a through-hole that penetrates the nozzle plate 11 in a plate thickness direction thereof. The plate thickness direction of the nozzle plate 11 follows the Z-axis direction. The nozzle rows NLA, NLB, NLC, and NLD are disposed at positions different from each other in the Y-axis direction.

The nozzle row NLA, the nozzle row NLC, the nozzle row NLD, and the nozzle row NLB are disposed in this order toward the Y1 direction. The nozzle row NLA, the nozzle row NLC, the nozzle row NLD, and the nozzle row NLB are spaced apart from each other in the Y-axis direction. The nozzle row NLC is disposed between the nozzle row NLA and the nozzle row NLB in the Y-axis direction. The nozzle row NLD is disposed between the nozzle row NLC and the nozzle row NLB in the Y-axis direction.

When viewed in the Y-axis direction, the nozzle row NLA, the nozzle row NLC, the nozzle row NLD, and the nozzle row NLB at least partially overlap each other. In the present embodiment, when viewed in the Y-axis direction, the nozzle row NLA, the nozzle row NLC, the nozzle row NLD, and the nozzle row NLB entirely overlap each other.

As shown in FIG. 1, the liquid ejecting head 10 is held, for example, in an inclined posture with respect to a housing 1*a* of the liquid ejecting apparatus 1. "The liquid ejecting head 10 is held with respect to the housing 1*a* of the liquid ejecting apparatus 1" includes both of a case where the liquid ejecting head 10 is held by being directly fixed to the housing 1*a* and a case where the liquid ejecting head 10 is indirectly held with respect to the housing 1*a* via a member different from the housing 1*a*. The liquid ejecting apparatus 1 can hold the liquid ejecting head 10 in the inclined posture in which the ejection surface F1 is inclined with respect to the horizontal plane F0.

Figure 4:
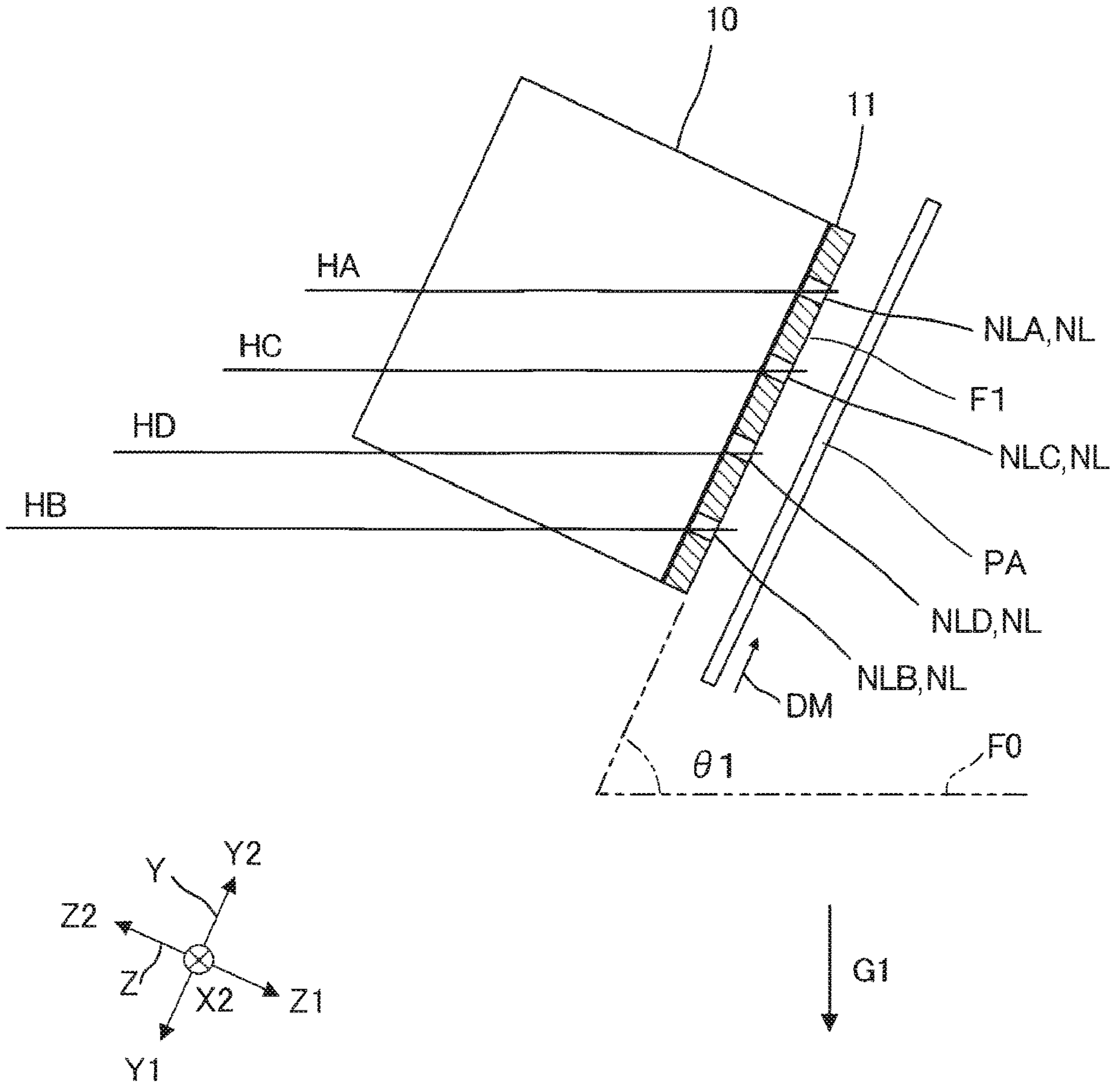
FIG. 4 is a schematic view showing a liquid ejecting head in an inclined posture in which an ejection surface is inclined with respect to a horizontal plane.

FIG. 4 is a schematic view showing the liquid ejecting head 10 in the inclined posture in which the ejection surface F1 is inclined with respect to the horizontal plane F0. As shown in FIG. 4, the ejection surface F1 of the liquid ejecting head 10 is inclined with respect to the horizontal plane F0 at an inclination angle θ1. The inclination angle θ1 is, for example, an acute angle that is less than 90 degrees. The inclination angle θ1 may be an obtuse angle exceeding 90 degrees. The inclination angle θ1 may be 90 degrees. The inclination referred herein includes 90 degrees. The inclined posture of the liquid ejecting head 10 in which the ejection surface F1 is inclined with respect to the horizontal plane F0 at the inclination angle θ1 is an example of a first posture.

In the inclined posture of the liquid ejecting head 10 shown in FIG. 4, the plurality of nozzle rows NL are disposed at heights different from each other in the gravity direction G1. The nozzle row NLA is disposed at a height position HA, and the nozzle row NLB is disposed at a height position HB. The height position HA is positioned above the height position HB. That is, the nozzle row NLA for ejecting the first ink having a lower dynamic surface tension is positioned above the nozzle row NLB for ejecting the second ink having a higher dynamic surface tension.

The nozzle row NLC is disposed at a height position HC. The height position HC is below the height position HA and is above the height position HB. In the inclined posture of the liquid ejecting head 10, the nozzle row NLC is positioned below the nozzle row NLA and above the nozzle row NLB. That is, the nozzle row NLC for ejecting the third ink having the second lowest dynamic surface tension, among the first ink, the second ink, and the third ink, is disposed between the nozzle row NLA and the nozzle row NLB in the gravity direction G1.

The nozzle row NLD is disposed at a height position HD. The height position HD is below the height position HC and is above the height position HB. In the inclined posture of the liquid ejecting head 10, the nozzle row NLD is positioned below the nozzle row NLC and above the nozzle row NLB. That is, the nozzle row NLD for ejecting the fourth ink having the second lowest dynamic surface tension, among the second ink, the third ink, and the fourth ink, is disposed between the nozzle row NLC and the nozzle row NLB in the gravity direction G1.

As shown in FIG. 4, when viewed in the X-axis direction, the nozzle row NLA, the nozzle row NLC, the nozzle row NLD, and the nozzle row NLB are disposed at intervals from each other.

When comparing the plurality of nozzle rows NL to each other, the nozzle row NL for ejecting an ink having a lower dynamic surface tension is positioned above the nozzle row NL for ejecting an ink having a higher dynamic surface tension.

Figure 5:
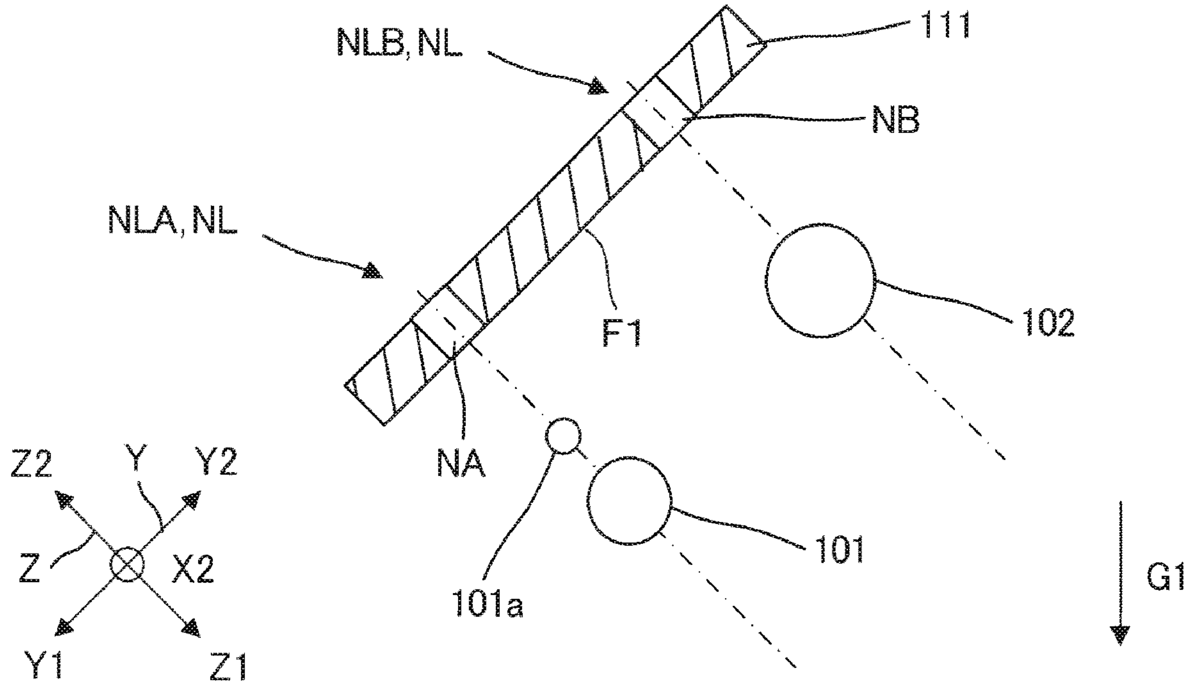
FIG. 5 is a cross-sectional view showing a nozzle plate according to comparative example 1 and is a view showing a state where a droplet is ejected from a nozzle.
Figure 6:
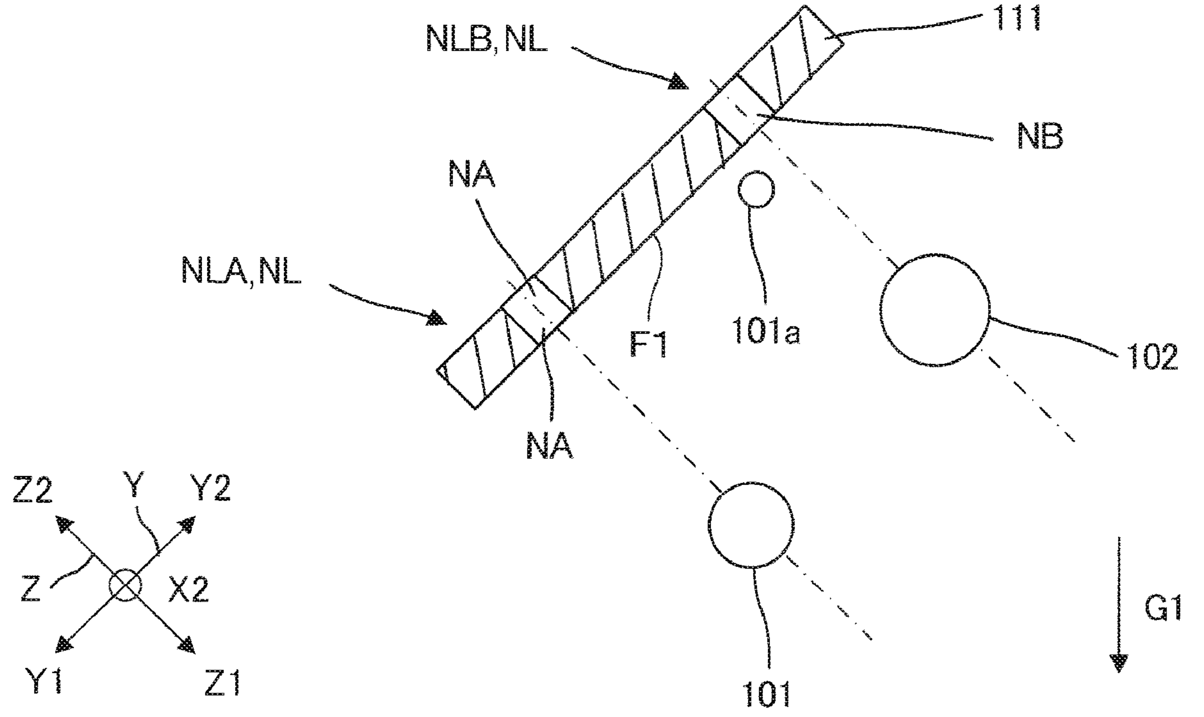
FIG. 6 is a cross-sectional view showing the nozzle plate according to comparative example 1 and is a view showing a state where a satellite droplet separated out from the droplet rises.
Figure 7:
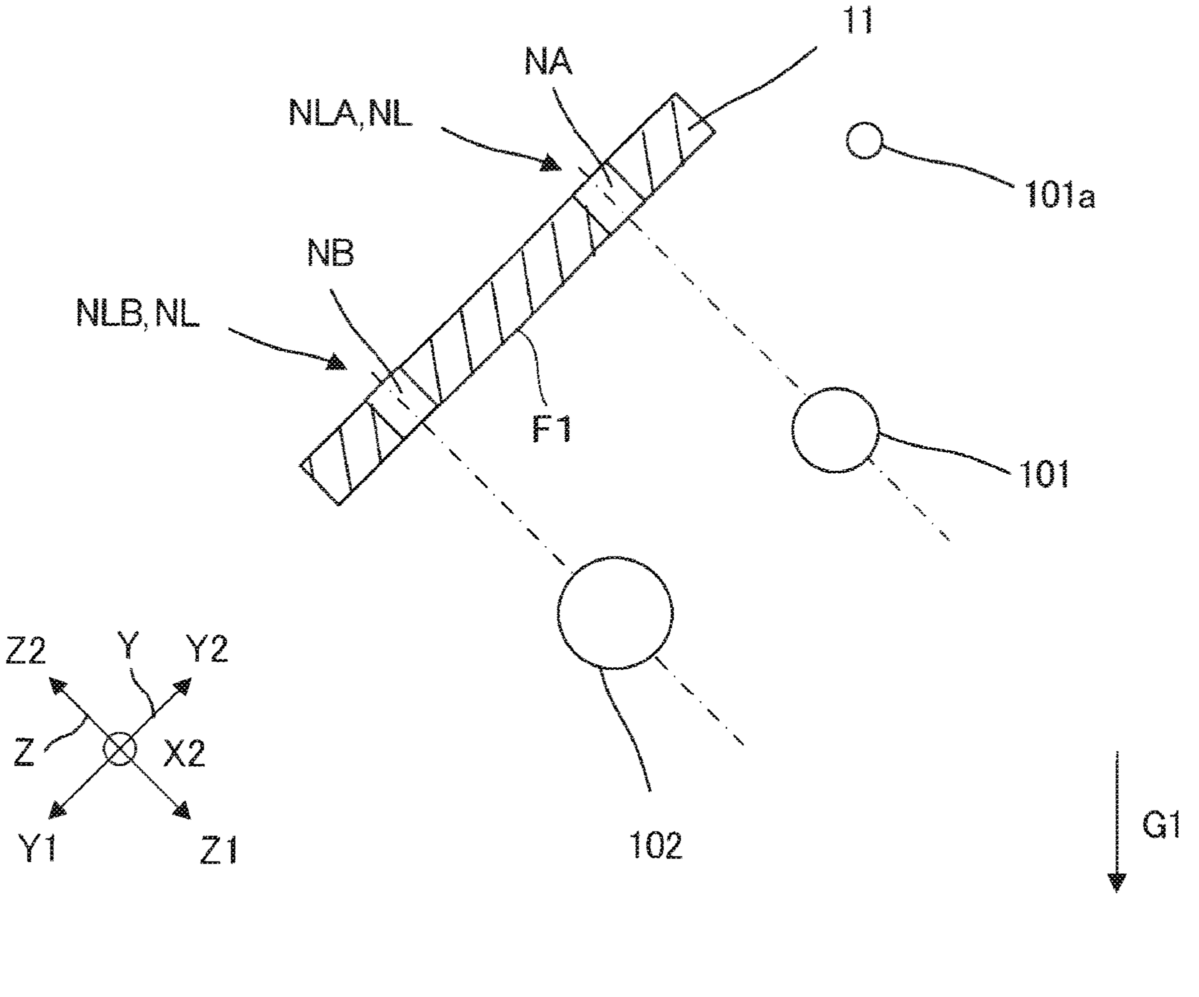
FIG. 7 is a cross-sectional view showing a nozzle plate according to example 1 and is a view showing a state where the droplet is ejected from the nozzle.

Next, behavior of droplets 101 and 102 ejected from the nozzle N and a satellite droplet 101*a* separated out from the droplet 101 will be described with reference to FIGS. 5 to 7. Herein, the nozzle plates 11 and 111 for ejecting two types of inks having dynamic surface tensions different from each other will be described as examples. FIGS. 5 and 6 show the nozzle plate 111 according to comparative example 1, and FIG. 7 shows the nozzle plate 11 according to example 1. In the nozzle plate 111 according to comparative example 1, the nozzle row NLB for ejecting the second ink having a higher dynamic surface tension is positioned above the nozzle row NLA for ejecting the first ink having a lower dynamic surface tension. In the nozzle plate 11 according to example 1, contrary to the case of comparative example 1, the nozzle row NLA for ejecting the first ink is positioned above the nozzle row NLB for ejecting the second ink.

FIG. 5 is a cross-sectional view showing the nozzle plate 111 according to comparative example 1 and is a view showing a state where droplets are ejected from a nozzle. The droplet 102, which is the second ink, is ejected from the nozzle NB. The droplet 101, which is the first ink, is ejected from the nozzle NA. The dynamic surface tension of the first ink is lower than the dynamic surface tension of the second ink, and the satellite droplet 101*a* is more likely to be generated compared to the second ink. The volume of the satellite droplet 101*a* is smaller than the volume of the droplet 101. The mass of the satellite droplet 101*a* is smaller than the mass of the droplet 101. According to the study by the present inventors, it was found that the satellite droplet 101*a* rises toward the upward direction G2 after being ejected from the nozzle N.

FIG. 6 is a cross-sectional view showing the nozzle plate 111 according to comparative example 1 and is a view showing a state where the satellite droplet separated out from the droplet 101 rises. As shown in FIG. 6, when the satellite droplet 101*a* rises, there is a possibility of being attached to the nozzle NB in the ejection surface F1. When the satellite droplet 101*a* is attached to the nozzle NB, there is a possibility that a printing quality decreases as the second ink in the nozzle NB and the first ink, which is the satellite droplet 101*a*, are mixed with each other. In addition, there is also a possibility that as the satellite droplet 101*a* rises, the satellite droplet 101*a* attaches to a portion of the ejection surface F1 near the nozzle NB, causing an abnormality in the meniscus of the second ink, which is formed in the nozzle NB, and bringing about an ejection failure.

FIG. 7 is a cross-sectional view showing the nozzle plate 11 according to example 1 and is a view showing a state where the droplets 101 and 102 are ejected from the nozzles NA and NB. In the state shown in FIG. 7, the satellite droplet 101*a* separated out from the droplet 101 is positioned above the droplet 101. The nozzle NB and the droplet 102 are not present above the satellite droplet 101*a*. For this reason, there is no possibility that the satellite droplet 101*a* is attached to the droplet 102. As described above, since the nozzle row NLA for ejecting the first ink having a lower dynamic surface tension is positioned above the nozzle row NLB in the gravity direction G1, a probability of causing color mixing between the first ink and the second ink and an abnormality in the meniscus of the first ink in the nozzle N of the nozzle row NLA can be reduced in example 1.

In the liquid ejecting head 10 according to the first embodiment shown in FIG. 4, the nozzle rows NLA, NLB, NLC, and NLD are disposed according to the dynamic surface tension of an ink. The nozzle row NLA for ejecting the first ink having the lowest dynamic surface tension is disposed at a position higher than the other nozzle rows NLB, NLC, and NLD in the gravity direction G1. As described above, since the nozzle row NLA for ejecting the first ink, which is most likely to generate satellite droplets, is disposed at a higher position, mixing of the first ink with the other second ink, the third ink, and the fourth ink and an abnormality in the meniscus of the first ink in the nozzle N of the nozzle row NLA are prevented from being caused.

In the liquid ejecting head 10, the nozzle row NLB for ejecting the second ink having the highest dynamic surface tension is disposed at a position lower than the other nozzle rows NLA, NLC, and NLD in the gravity direction G1. As described above, since the nozzle row NLB for ejecting the second ink, which is most unlikely to generate satellite droplets, is disposed at a lower position, mixing of the second ink with the other first ink, the third ink, and the fourth ink and an abnormality in the menisci of the first ink, third ink, and fourth ink in the nozzles N of the nozzle rows NLA, NLC, and NLD are prevented from being caused.

Since the nozzle row for ejecting the first ink having a lower dynamic surface tension is positioned above the nozzle row for ejecting the second ink having a higher dynamic surface tension in the gravity direction G1, the mixing of different types of inks and an abnormality in the meniscus of the nozzle N are suppressed in the liquid ejecting head 10. As a result, the printing accuracy of the liquid ejecting apparatus 1 can be improved. Compared to the configuration of comparative example 1 in which the nozzle row NL for ejecting the second ink having a higher dynamic surface tension is disposed at a position higher than the nozzle row NL for ejecting the first ink having a lower dynamic surface tension, a probability that the plurality of inks are mixed with each other and a probability that an abnormality in the meniscus of an ink in the nozzle N is caused are low in the liquid ejecting head 10.

In the liquid ejecting head 10, the nozzle row NLC is positioned between the nozzle row NLA and the nozzle row NLB in the gravity direction G1. The dynamic surface tension of the third ink ejected from the nozzle row NLC is higher than the dynamic surface tension of the first ink and is lower than the dynamic surface tension of the second ink. A probability that the satellite droplet separated out from the first ink is attached to the third ink below is low. Since a probability that a satellite droplet is generated from the second ink is low, a probability that the second ink is attached to the third ink and a probability that an abnormality in the meniscus of the third ink in the nozzle N of the nozzle row NLC is caused are low.

In the liquid ejecting head 10, the nozzle row NLD is positioned between the nozzle row NLC and the nozzle row NLB in the gravity direction G1. The dynamic surface tension of the fourth ink ejected from the nozzle row NLD is higher than the dynamic surface tension of the third ink and is lower than the dynamic surface tension of the second ink. A probability that the satellite droplet separated out from second ink is attached to the fourth ink above is low. Since a probability that a satellite droplet is generated from the second ink is low, a probability that the second ink is attached to the fourth ink and a probability that an abnormality in the meniscus in the nozzle N of the nozzle row NLD is caused are low.

Figure 8:
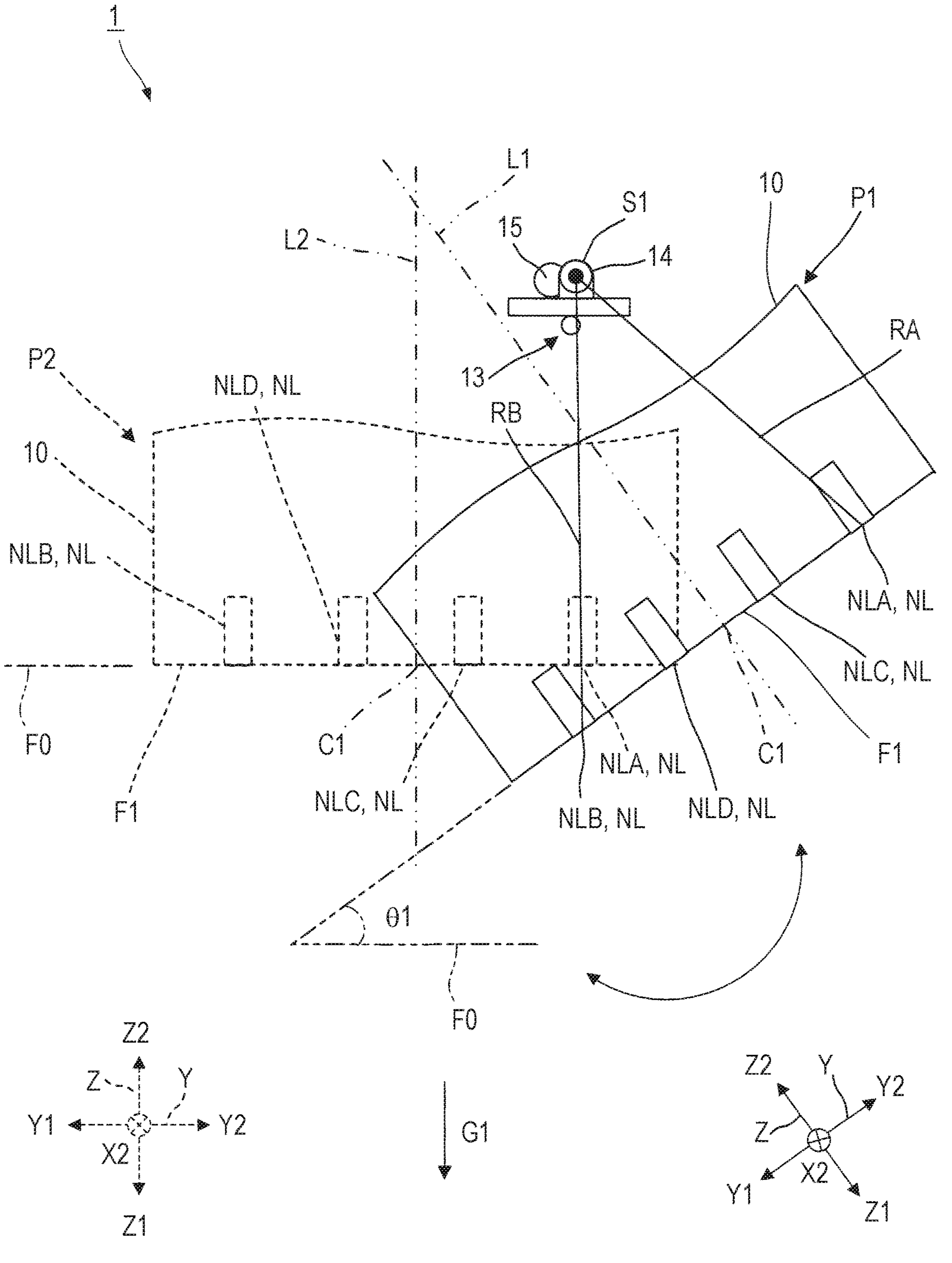
FIG. 8 is a schematic view showing a liquid ejecting head of a liquid ejecting apparatus according to example 2.

Next, a posture change of the liquid ejecting head 10 according to example 2 will be described with reference to FIG. 8. FIG. 8 is a schematic view showing the liquid ejecting head 10 according to example 2. In FIG. 8, the liquid ejecting head 10 in a first posture P1 in which the ejection surface F1 is inclined with respect to the horizontal plane F0 is shown by a solid line, and the liquid ejecting head 10 in a second posture P2 in which the ejection surface F1 is disposed along the horizontal plane F0 is shown by a broken line. The liquid ejecting head 10 can rotationally move around a rotation shaft S1 extending in the X-axis direction.

The posture of the liquid ejecting head 10 can be changed to a plurality of postures including the first posture P1 and the second posture P2. The liquid ejecting apparatus 1 according to example 2 has a posture changing mechanism 13 that changes the posture of the liquid ejecting head 10. The posture changing mechanism 13 includes a bearing 14 that holds the rotation shaft S1 extending in the X-axis direction and a drive mechanism 15 that rotates the rotation shaft S1. The bearing 14 rotatably supports the rotation shaft S1. The drive mechanism 15 includes, for example, a motor.

In FIG. 8, imaginary lines L1 and L2 are shown by two-dot chain lines. The imaginary line L1 is an imaginary straight line that passes through a center C1 between the nozzle row NLA and the nozzle row NLB and that extends in a direction perpendicular to the ejection surface F1 in the first posture P1. The imaginary line L1 extends in the Z-axis direction when viewed in the X-axis direction. When the liquid ejecting head 10 is in the first posture P1, the rotation shaft S1 is positioned closer to the nozzle row NLA when viewed from the imaginary line L1. In other words, when the liquid ejecting head 10 is in the first posture P1, the rotation shaft S1 is positioned closer to the nozzle row NLA than the imaginary line L1 is in the Y-axis direction.

The imaginary line L2 is an imaginary straight line that passes through the center C1 between the nozzle row NLA and the nozzle row NLB and that extends in the direction perpendicular to the ejection surface F1 in the second posture P2. The imaginary line L2 extends in the Z-axis direction when viewed in the X-axis direction. In FIG. 8, arrows indicating the X-axis direction, the Y-axis direction, and the Z-axis direction in the second posture P2 are shown by broken lines. The first posture P1 and the second posture P2 are shifted from each other by the inclination angle θ1 when viewed in the X-axis direction. When the liquid ejecting head 10 is in the second posture P2, the rotation shaft S1 is positioned closer to the nozzle row NLB when viewed from the imaginary line L2. In other words, when the liquid ejecting head 10 is in the second posture P2, the rotation shaft S1 is positioned closer to the nozzle row NLA than the imaginary line L2 is in the Y-axis direction.

In the first posture P1 and the second posture P2, the rotation shaft S1 may be at the same position or may be at different positions. In the posture change of the liquid ejecting head 10 from the first posture P1 to the second posture P2, the liquid ejecting head 10 may include a linear movement. The liquid ejecting apparatus 1 can linearly move the bearing 14 that holds the rotation shaft S1. For example, the liquid ejecting apparatus can linearly move the bearing with a rack and pinion. The liquid ejecting head 10 can be linearly moved using other ball screws, guide grooves, actuators, and belt mechanisms.

Next, a centrifugal force acting on a meniscus during the rotational movement of the liquid ejecting head 10 will be described. When the liquid ejecting head 10 rotationally moves around the rotation shaft S1, a centrifugal force acts on menisci in the plurality of nozzle rows NL. Radius of gyration RB from the rotation shaft S1 to the nozzle row NLB is larger than radius of gyration RA from the rotation shaft S1 to the nozzle row NLA. During the rotational movement of the liquid ejecting head 10, the magnitude of a centrifugal force acting on the meniscus of the nozzle row NLA and the magnitude of a centrifugal force acting on the meniscus of the nozzle row NLB are different from each other. During the rotational movement of the liquid ejecting head 10, the magnitude of the centrifugal force acting on the meniscus of the nozzle row NLB is greater than the magnitude of the centrifugal force acting on the meniscus of the nozzle row NLA.

A centrifugal force that acts immediately after the start of the rotational movement of the liquid ejecting head 10 acts such that a meniscus in the nozzle N is moved outside the nozzle. In other words, the centrifugal force acts to move the meniscus in a direction separating away from the rotation shaft S1. An inertial force caused by the centrifugal force is a force that moves the meniscus in the nozzle N. In other words, the inertial force caused by the centrifugal force is a force acting on the meniscus in a direction approaching the rotation shaft S1. There is a possibility that the meniscus jumps out of the nozzle N or the meniscus is dented and bubbles in the nozzle N are drawn because of such a centrifugal force and the inertial force caused by the centrifugal force.

When the dynamic surface tension of an ink is the same, the nozzle row NLB having a larger centrifugal force has a higher probability that the meniscus disintegrates than the nozzle row NLA having a smaller centrifugal force. In the liquid ejecting head 10, the first ink having a lower dynamic surface tension is supplied to the nozzle row NLA, and the second ink having a higher dynamic surface tension is supplied to the nozzle row NLB. The first ink is supplied to the nozzle row NLA having a smaller centrifugal force, and the second ink is supplied to the nozzle row NLB having a greater rotational momentum. Accordingly, since the second ink having a higher dynamic surface tension is supplied to a nozzle having a larger centrifugal force, the disintegration of a meniscus can be suppressed.

In the liquid ejecting head 10, among a plurality of types of inks, an ink having a higher dynamic surface tension is supplied to the nozzle row NL having a larger centrifugal force, and an ink having a lower dynamic surface tension is supplied to the nozzle row NL having a smaller centrifugal force. Accordingly, the disintegration of a meniscus of an ink in the nozzle N is suppressed.

In the liquid ejecting head 10, by suppressing the disintegration of a meniscus, the entry of bubbles into the nozzle N of the nozzle row NLA is suppressed, or the leakage of an ink from the nozzle N of the nozzle row NLA is suppressed.

The liquid ejecting head 10 according to example 2 includes the plurality of nozzle rows NL, each of which extends in the X-axis direction, but may include the nozzle row NL extending in the direction intersecting an X-axis in plan view of the ejection surface F1 toward the Z-axis direction. In this case, radius of gyration from the rotation shaft S1 to the nozzle row NL may be a distance between the nozzle N that is most separated from the rotation shaft S1, among the plurality of nozzles N configuring the nozzle row NL, and the rotation shaft S1 when viewed in the X-axis direction.

Figure 9:
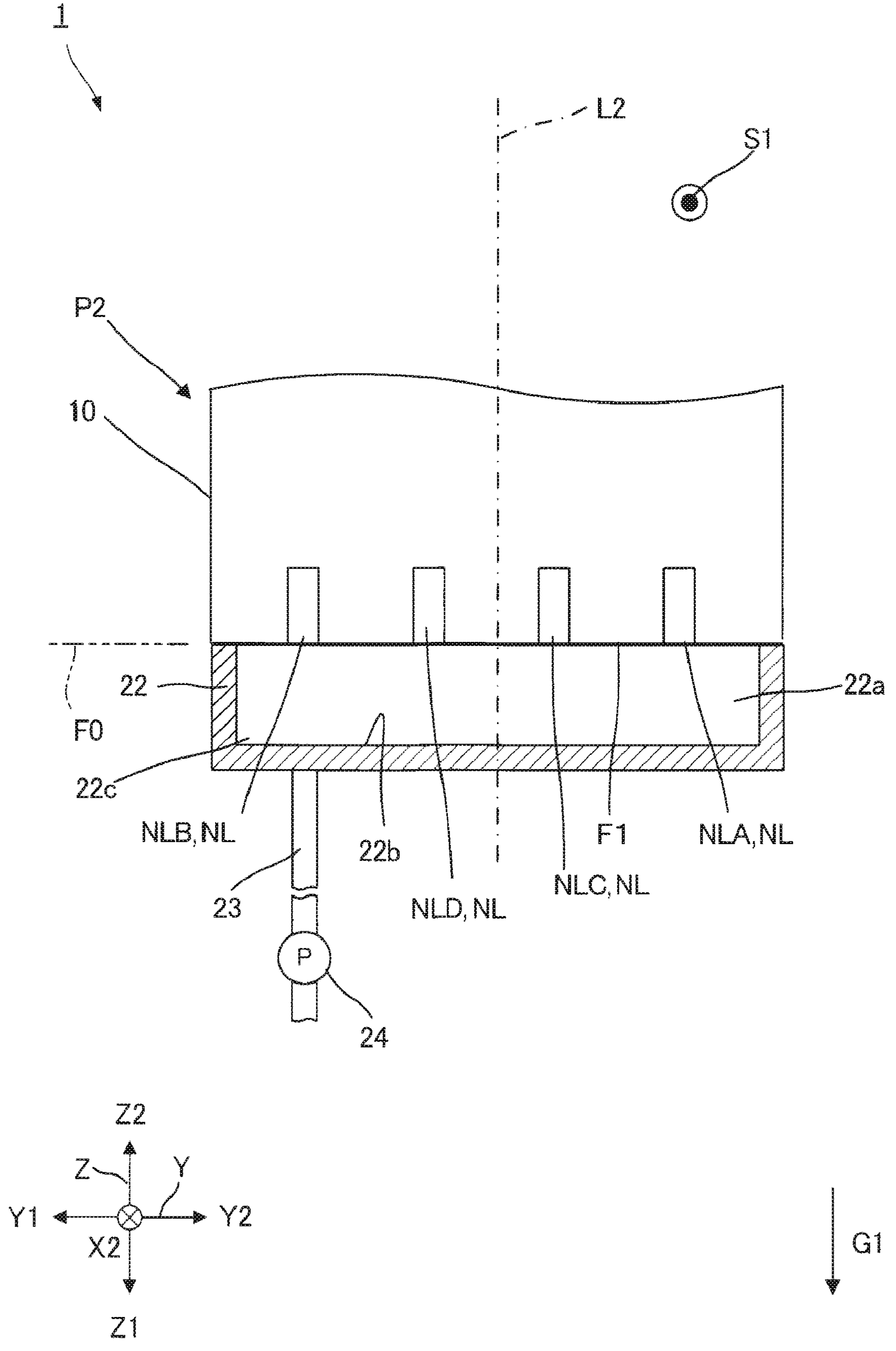
FIG. 9 is a schematic view showing a liquid ejecting head of a liquid ejecting apparatus according to example 3.

Next, the liquid ejecting head 10 according to example 3 will be described with reference to FIG. 9. FIG. 9 is a schematic view showing a cap 22 covering the liquid ejecting head 10 of the liquid ejecting apparatus 1 according to example 3 and the ejection surface F1 of the liquid ejecting head 10. The liquid ejecting apparatus 1 can perform a maintenance operation. The liquid ejecting apparatus 1 performs the maintenance operation in the second posture P2 of the liquid ejecting head 10. The liquid ejecting apparatus 1 performs a printing operation (recording operation) in the first posture P1 shown in FIG. 8 and performs the maintenance operation in the second posture P2 shown in FIG. 9. That is, the first posture P1 is an example of a "recording posture", and the second posture P2 is an example of a "maintenance posture". The printing operation is an example of the recording operation. The "recording operation" means discharging an ink from the nozzle N, attaching the ink to a medium, and recording text and an image.

The liquid ejecting apparatus 1 includes the cap 22, a pipe 23, and a pump 24 used in a maintenance operation. The cap 22 covers the ejection surface F1 of the liquid ejecting head 10. The cap 22 is disposed to cover openings of the nozzles N of the plurality of nozzle rows NL. A space 22*a* receiving an ink discharged from the nozzles N is formed in the cap 22.

The pipe 23 is coupled to the cap 22. The pipe 23 is a pipe through which an ink in the space 22*a* of the cap 22 is discharged. The pump 24 is coupled to the pipe 23. By driving the pump 24, an ink in the cap 22 can be sucked and discharged to the outside of the cap 22.

The maintenance operation of the liquid ejecting apparatus 1 includes flushing processing, suction cleaning processing, and pressurization cleaning processing. The maintenance operations are performed in the second posture P2 of the liquid ejecting head 10. In the flushing processing, an ink that does not contribute to the recording operation is discharged from the nozzle N as pressure fluctuations act on a pressure chamber that communicates with the nozzle N using an actuator of the liquid ejecting head 10. In the suction cleaning processing, for example, an ink is sucked from the nozzle N using the pump 24. In addition, in the pressurization cleaning processing, an ink may be discharged from the nozzle N by pressurizing the ink flow path in the liquid ejecting head 10 upstream from the pressure chamber using a pump (not shown).

As described above, in the liquid ejecting apparatus 1, an unnecessary ink in the nozzle N can be discharged to the outside of the liquid ejecting head 10 by performing maintenance processing. In the second posture P2 of the liquid ejecting head 10, the ejection surface F1 is parallel to the horizontal plane F0. Since a maintenance operation can be performed in the second posture P2 in the liquid ejecting apparatus 1, the remaining amount of an ink in the cap 22 can be reduced at a time of air suction in which the pump 24 is driven in a state where a space in the cap 22 communicates with the atmosphere. For example, when the liquid ejecting head 10 is in the first posture P1, an ink remains in a corner portion 22*c* in the cap 22 since the cap 22 is inclined. On the other hand, in the present example, since the maintenance operation is performed in a state of being disposed along the horizontal plane F0, a bottom surface 22*b* of the cap 22 can reduce the amount of an ink remaining in the cap 22.

In the liquid ejecting apparatus 1, the posture of the liquid ejecting head 10 can be changed from the first posture P1 to the second posture P2. As described above, when the liquid ejecting head 10 rotationally moves around the rotation shaft S1, there is a possibility that a centrifugal force and an inertial force caused by the centrifugal force act on the meniscus of an ink in the nozzle row NL and the meniscus disintegrates. Since among a plurality of types of inks, the second ink having the highest dynamic surface tension is supplied to the nozzle row NLB which has the largest centrifugal force and the largest inertial force caused by the centrifugal force, a probability that a meniscus disintegrates is reduced in the liquid ejecting apparatus 1. By suppressing the disintegration of the meniscus, the entry of bubbles into the nozzle N of the liquid ejecting head 10 is suppressed, or the leakage of an ink from the nozzle N of the nozzle row NLA is suppressed.

Figure 10:
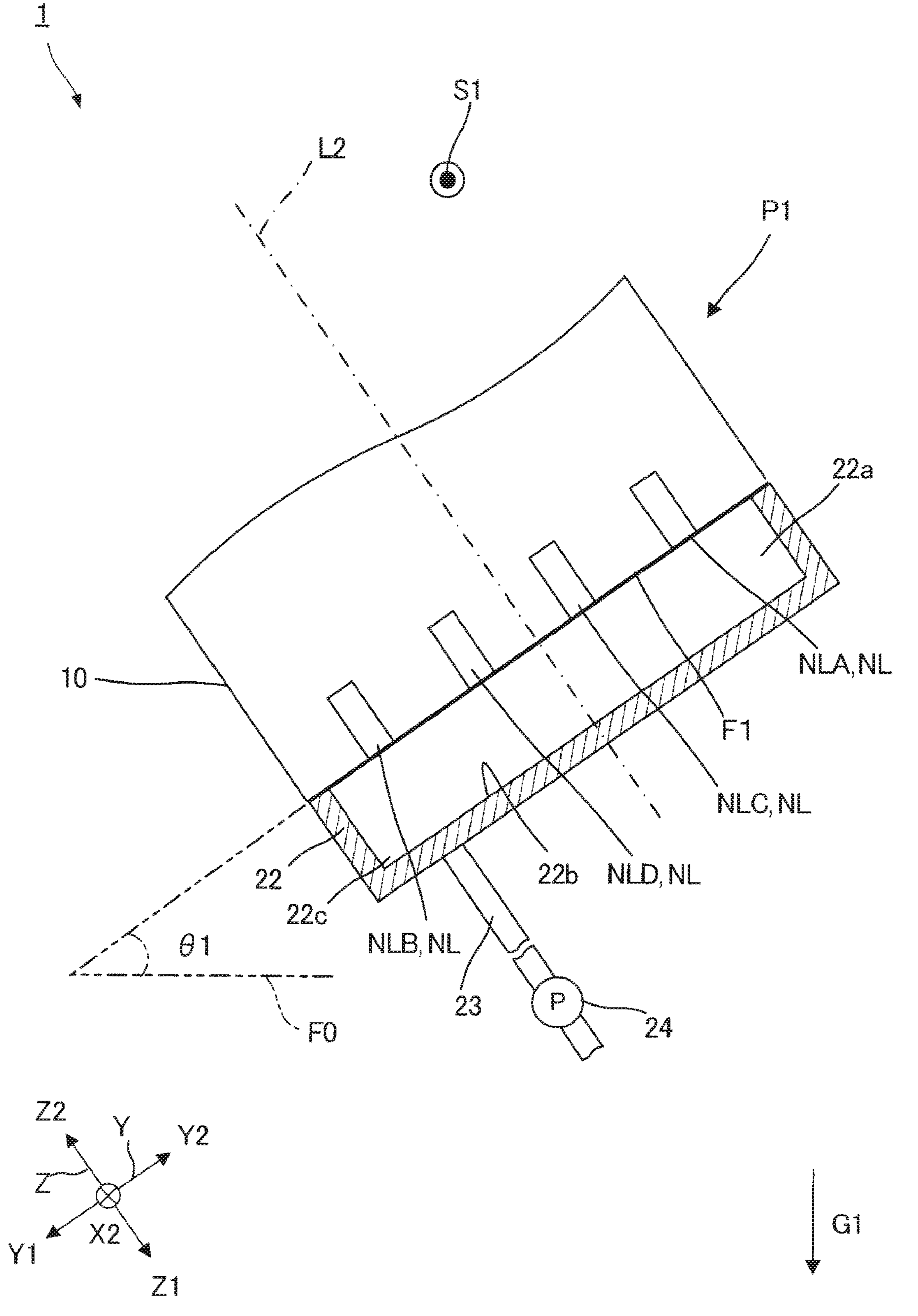
FIG. 10 is a schematic view showing a liquid ejecting head of a liquid ejecting apparatus according to example 4.

Next, a maintenance operation in a state where the liquid ejecting head 10 is inclined will be described with reference to FIG. 10. As shown in FIG. 10, in the state of the first posture P1 in which the liquid ejecting head 10 is inclined, the maintenance operation may be performed.

The liquid ejecting apparatus 1 including the liquid ejecting head 10 performs, in the state of the first posture P1, a cleaning operation of discharging the first ink from the nozzle row NLA to the ejection surface F1 and discharging the second ink from the second nozzle row NLB to the ejection surface F1. The cleaning operation is one of the maintenance operations. Discharging an ink to the ejection surface F1 means, for example, disintegrating the meniscus of the ink in the nozzle N and leaking the ink from the nozzle N. The ink leaked from the nozzle N flows along the ejection surface F1.

Herein, when an ink having a higher dynamic surface tension is discharged to the ejection surface F1, the ink tends to easily stay on the ejection surface F1, and when an ink having a lower dynamic surface tension is discharged to the ejection surface F1, the ink tends to easily move on the ejection surface F1. The first ink having a lower dynamic surface tension leaks from the nozzle row NLA disposed at the highest position, among the plurality of nozzle rows NL. Accordingly, an ink attached to the ejection surface F1 can be washed away. Since the first ink that is most likely to flow along the ejection surface F1 is discharged from a higher position, the second ink that is discharged from a lower position and is likely to stay on the ejection surface F1 can be washed away. As a result, the amount of ink remaining on the ejection surface F1 can be reduced. When the ink remains on the ejection surface F1, there is a possibility that the ink attached to the ejection surface F1 flows downward and is mixed with an ink ejected from the nozzle N below. However, since the amount of ink remaining on the ejection surface F1 is reduced in the liquid ejecting apparatus 1, a decrease in a printing quality is suppressed.

In the cleaning operation, pressurization cleaning processing may be performed, or suction cleaning processing may be performed.

Next, the liquid ejecting apparatus 1 according to example 5 will be described with reference to FIG. 11. In example 5, when the liquid ejecting apparatus 1 is mounted on a floor surface 26, an effect of a centrifugal force acting on the nozzle row NL of the liquid ejecting head 10 will be described. The liquid ejecting head 10 of the liquid ejecting apparatus 1 is disposed to be inclined with respect to the horizontal plane F0. The liquid ejecting apparatus 1 includes the housing 1*a* accommodating the liquid ejecting head 10. The liquid ejecting head 10 is held with respect to the housing 1*a*. Leg portions 1*c* and 1*d* are provided at a bottom portion of the housing 1*a*. The leg portions 1*c* and 1*d* are disposed on the floor surface 26. The floor surface 26 follows, for example, the horizontal plane F0.

Figure 11:
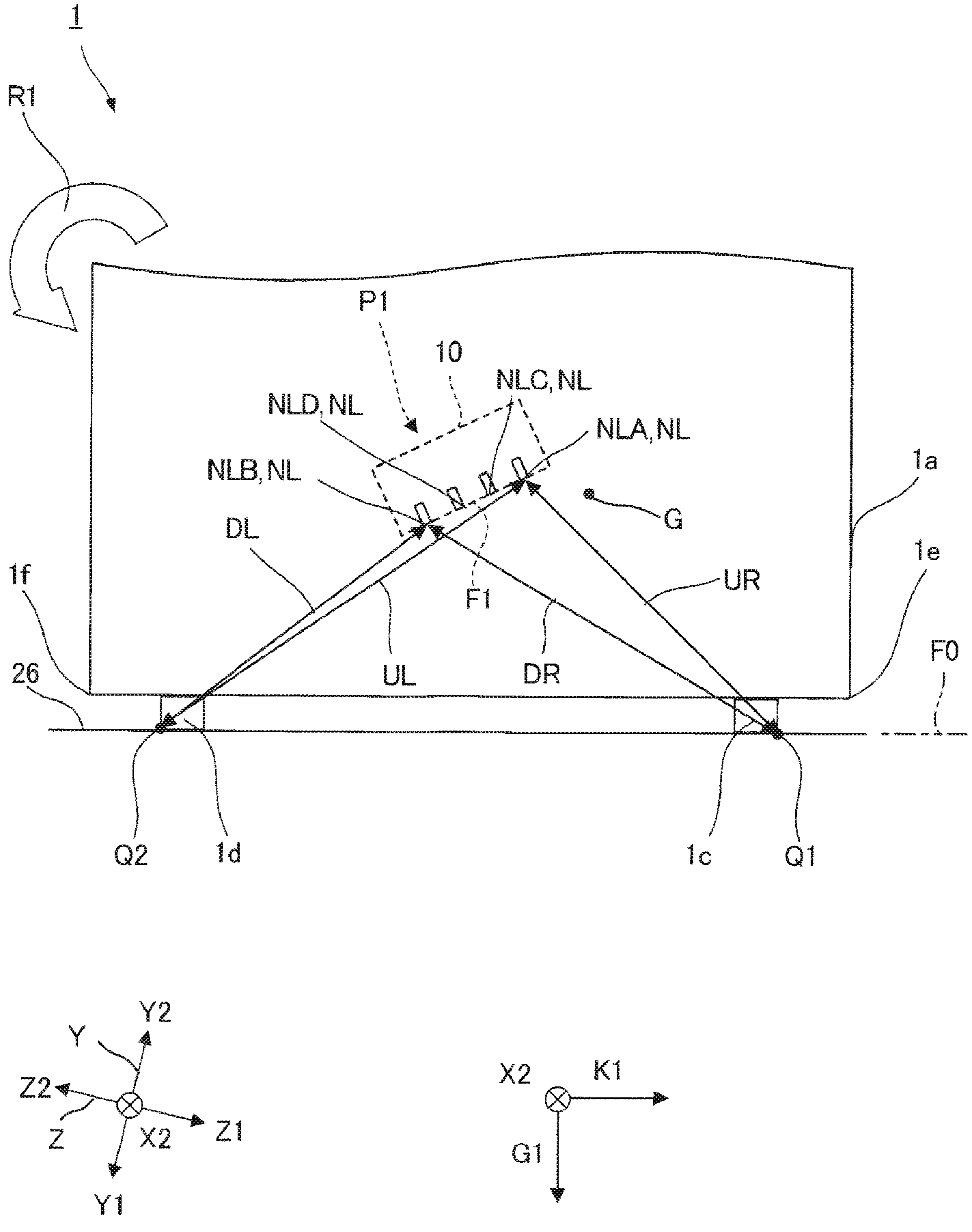
FIG. 11 is a schematic view showing a liquid ejecting apparatus according to example 5.

In FIG. 11, the K-axis direction orthogonal to the gravity direction G1 is shown by an arrow when viewed in the X-axis direction. The K-axis direction follows a right-left direction in FIG. 11. The leg portions 1*c* and 1*d* are spaced apart from each other in the K-axis direction. For example, the K-axis direction follows a longitudinal direction of the housing 1*a* when the liquid ejecting apparatus 1 is viewed in the gravity direction G1. The leg portions 1*c* and 1*d* may be spaced apart from each other in other directions.

The leg portion 1*c* includes a contact point Q1, and the leg portion 1*d* includes a contact point Q2. The contact point Q1 is an example of a first contact point, and the contact point Q2 is an example of a second contact point. The contact points Q1 and Q2 are portions in contact with the floor surface 26 in a state where the housing 1*a* is mounted on the floor surface 26. The contact point Q1 is positioned closer to one end 1*e* of the housing 1*a* in the K-axis direction. The contact point Q2 is positioned closer to the other end if of the housing 1*a* in the K-axis direction. The one end 1*e* of the housing 1*a* is an end portion of the housing 1*a* in the K1 direction. The other end if of the housing 1*a* is an end portion in the K2 direction.

A center of gravity G of the liquid ejecting apparatus 1 is between the contact point Q1 and the contact point Q2 in the K-axis direction and is positioned closer to the contact point Q1 than to the contact point Q2. When viewed in the X-axis direction, a distance DR between the contact point Q1 and the nozzle row NLB is longer than a distance UR between the contact point Q1 and the nozzle row NLA. When viewed in the X-axis direction, a distance UL between the contact point Q2 and the nozzle row NLA is longer than a distance DL between the contact point Q2 and the nozzle row NLB. The position of the nozzle row NL is, for example, a center position of the opening of the nozzle N in the ejection surface F1.

In the first posture P1 of the liquid ejecting head 10 shown in FIG. 11, the distance DR is longer than the distance UR. In the first posture of the liquid ejecting head 10, the distance UL is longer than the distance DR.

For example, when the liquid ejecting apparatus 1 is moved, it is assumed that a plurality of operators hold and move the liquid ejecting apparatus 1 and finally mount the liquid ejecting apparatus 1 on the floor surface 26. For example, two operators separated from each other in the K-axis direction can hold the liquid ejecting apparatus 1 from both sides. When mounting the liquid ejecting apparatus 1 on the floor surface 26, one operator closer to the one end 1*e* first brings the leg portion 1*c* into contact with the floor surface 26, and then the other operator closer to the other end if brings the leg portion 1*d* into contact with the floor surface 26. In a case where the leg portion 1*c* is brought into contact with the floor surface 26 first, the liquid ejecting apparatus 1 rotationally moves counterclockwise R1 when viewed in the X-axis direction with the contact point Q1 as a fulcrum. In this case, since the distance DR is longer than the distance UR, a centrifugal force that is larger than a centrifugal force acting on the nozzle row NLA acts on the nozzle row NLB.

As described above, when mounting the liquid ejecting apparatus 1 on the floor surface 26, a centrifugal force and an inertial force caused by the centrifugal force, which have different magnitudes according to the distances UR and DR from the contact point Q1, are generated in the nozzle rows NLA and NLB. In the liquid ejecting apparatus 1, the first ink is supplied to the nozzle row NLA, and the second ink is supplied to the nozzle row NLB. The second ink having a higher dynamic surface tension is supplied to the nozzle row NLB having a larger centrifugal force and a larger inertial force, and the first ink having a lower dynamic surface tension is supplied to the nozzle row NLA having a smaller centrifugal force and a smaller inertial force. Accordingly, a probability of the disintegration of the meniscus of the second ink in the nozzle row NLB can be reduced in the liquid ejecting head 10. That is, compared to a case where the first ink is supplied to the nozzle row NLB, a case where the second ink is supplied to the nozzle row NLB has a low probability of the disintegration of the meniscus.

In the case of the liquid ejecting apparatus 1, since the center of gravity G of the liquid ejecting apparatus 1 is positioned closer to the leg portion 1*c* than the leg portion 1*d* in the K-axis direction, there is a high probability that the operator first brings the leg portion 1*c* into contact with the floor surface 26 before the leg portion 1*d*. Since the first ink is supplied to the nozzle row NLA as described above, a probability of the disintegration of the meniscus in the nozzle row NLA is reduced in the liquid ejecting apparatus 1.

When moving the liquid ejecting apparatus 1, the plurality of operators may hold the liquid ejecting apparatus 1 while being separated away in the X-axis direction. Since the nozzle row NLA is positioned above the nozzle row NLB in the gravity direction G1, among contact points between the housing 1*a* and the floor surface 26, a distance between a contact point positioned most in the X1 direction and the nozzle row NLB is longer than a distance between the contact point and the nozzle row NLA. Similarly, among contact points between the housing 1*a* and the floor surface 26, a distance between a contact point positioned most in the X2 direction and the nozzle row NLB is longer than a distance between the contact point and the nozzle row NLA. Therefore, since the first ink is assigned to the nozzle row NLA regardless of a case of lowering the end portion of the housing 1*a* in the X1 direction first or a case of lowering the end portion of the housing 1*a* in the X2 direction first, the disintegration of the meniscus can be suppressed.

The liquid ejecting head 10 according to example 5 includes the plurality of nozzle rows NL, each of which extends in the X-axis direction, but may include the nozzle row NL extending in the direction intersecting the X-axis in plan view of the ejection surface F1 toward the Z-axis direction. In this case, a distance from a contact point to the nozzle row NL may be a distance between the contact point and the nozzle N that is most separated from the contact point viewed in the X-axis direction, among the plurality of nozzles N configuring the nozzle row NL.

Next, a measuring method of a dynamic surface tension of an ink and properties of the ink will be described. The dynamic surface tension of an ink can be acquired, for example, through a maximum bubble pressure method. The measuring method of a dynamic surface tension may be other measuring methods, and examples thereof include a suspension method, a Wilhelmy method, and an annular method. In the maximum bubble pressure method, a tip of a thin tube is immersed with an ink, and a maximum pressure required to release bubbles from the thin tube is measured. In the maximum bubble pressure method, bubbles are continuously generated at the tip of the thin tube, and the maximum pressure is measured.

In the maximum bubble pressure method, when measuring the maximum pressure, a time from a time point when new bubbles are generated at the tip of the thin tube to a time point when the maximum bubble pressure is reached is defined as a lifetime. The maximum bubble pressure is reached at a time point when the radius of curvature of a bubble and the radius of the thin tube are equal to each other. The dynamic surface tension of an ink is a surface tension of the ink in a state where the ink is in motion. The dynamic surface tension of the ink can be adjusted, for example, by changing the type and content of a surfactant, a water-soluble organic solvent, and a resin included in the ink.

Hereinafter, although properties of an ink will be described, "part" and "%" regarding the amount of components are based on mass unless specified otherwise. FIG. 12 is a table showing components of an ink.

A pigment dispersion liquid 1 will be described. A styrene-ethyl acrylate-acrylic acid copolymer (resin dispersant) having an acid value of 150 mgKOH/g and a weight average molecular weight of 8,000 was prepared. The prepared resin dispersant was neutralized with potassium hydroxide equimolar to the acid value and was dissolved in ion-exchanged water to prepare an aqueous solution of the resin dispersant having a resin (solid content) content of 20.0%. A mixture was obtained by mixing 20.0 parts of pigment (C.I. Pigment Blue 15:3), 30.0 parts of the aqueous solution of the resin dispersant, and 50.0 parts of the ion-exchanged water with each other.

The obtained mixture and 200 parts of zirconia beads having a diameter of 0.3 mm were placed in a batch type vertical sand mill (manufactured by Aimex), were dispersed for 5 hours while cooling with water, and then were centrifuged to remove coarse particles. After pressure-filtration with a microfilter (manufactured by Fujifilm) having a pore size of 3.0 μm, an appropriate amount of ion-exchanged water was added to obtain the pigment dispersion liquid 2. The pigment content of the obtained pigment dispersion liquid 2 was 20.0%, and a resin dispersant content was 6.0%. The pigment dispersion liquid 1 was used in preparing the first ink having a cyan hue.

A pigment dispersion liquid 2 will be described. A solution obtained by dissolving 5.0 g of concentrated hydrochloric acid in 5.5 g of water was brought into a cooled state of 5° C., and 1.6 g of 4-aminophthalic acid was added to the solution in this state. A container containing this solution was placed in an ice bath and was stirred to maintain the temperature of the solution at 10° C. or lower, and a solution obtained by dissolving 1.8 g of sodium nitrite in 9.0 g of ion-exchanged water at 5° C. was added. After stirring the solution for 15 minutes, 6.0 g of pigment was added while being stirred, and the solution was further stirred for 15 minutes to obtain slurry. The pigment added while being stirred was carbon black having a specific surface area of 220 m2/g and a DBP oil absorption of 105 mL/100 g. The obtained slurry was filtered through filter paper, and particles were sufficiently washed with water and were dried in an oven at 110° C. Advantech's product name "standard filter paper No. 2" was used as the filter paper. After substituting counter ions from sodium ions to potassium ions through the ion exchange method, an appropriate amount of ion-exchanged water was added to adjust a pigment content, and the pigment dispersion liquid 1 having a pigment content of 20.0% was obtained. The pigment dispersion liquid 2 was used in preparing the second ink having a black hue.

A pigment dispersion liquid 3 will be described. The pigment dispersion liquid 4 having a pigment content of 20.0% and a resin dispersant content of 4.0% was obtained under the same procedures as in the pigment dispersion liquid 2 described above, except for changing to 20.0 parts of pigment (C.I. Pigment Magenta 122), 20.0 parts of the aqueous solution of the resin dispersant, and 60.0 parts of the ion-exchanged water. The pigment dispersion liquid 3 was used in preparing the third ink having a magenta hue.

A pigment dispersion liquid 4 will be described. The pigment dispersion liquid 3 having a pigment content of 20.0% and a resin dispersant content of 6.0% was obtained under the same procedures as in the pigment dispersion liquid 2 described above, except for changing the pigment to C.I. Pigment Yellow 74. The pigment dispersion liquid 4 was used in preparing the fourth ink having a yellow hue.

The adjustment of an ink will be described. After each component (unit: %) indicating the state of table 1 was mixed and sufficiently stirred, pressure-filtration with a cellulose acetate filter (manufactured by Advantech) having a pore size of 0.8 μm was performed, and each ink was prepared. In table 1, "Acetylenol E100" and "Acetylenol E60" are product names of surfactants manufactured by Kawaken Fine Chemicals. The lower part of table 1 shows a dynamic surface tension γ at a lifetime of 10 ms. The dynamic surface tension γ was measured using a dynamic surface tensiometer based on the maximum bubble pressure method under the condition of 25° C. "BUBBLE PRESSURE TENSIOMETER BP-2", which is a product name of a dynamic surface tensiometer manufactured by KRUSS, was used as the dynamic surface tensiometer.

Figure 13:
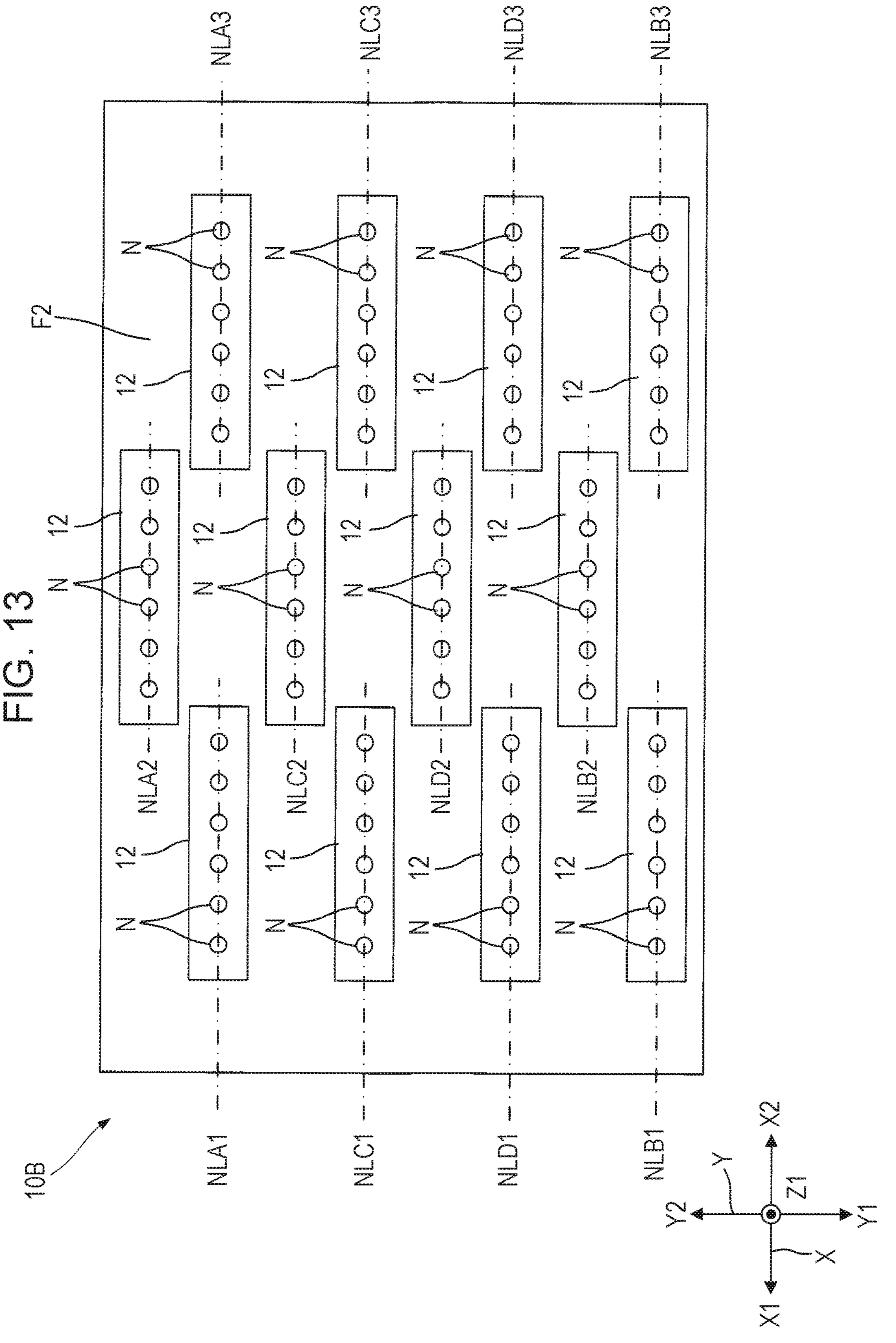
FIG. 13 is a bottom view showing an ejection surface of a liquid ejecting head according to modification example 1.

Next, disposition of the nozzle rows NL of a liquid ejecting head 10B according to modification example 1 will be described with reference to FIG. 13. FIG. 13 is a bottom view showing an ejection surface F2 of the liquid ejecting head 10B according to modification example 1. The liquid ejecting head 10B has the plurality of nozzle rows NL. The nozzle rows NL include nozzle rows NLA1, NLA2, and NLA3 for ejecting the first ink, nozzle rows NLB1, NLB2, and NLB3 for ejecting the second ink, nozzle rows NLC1, NLC2, and NLC3 for ejecting the third ink, and nozzle rows NLD1, NLD2, and NLD3 for ejecting the fourth ink. When not distinguishing between the nozzle rows NLA1, NLA2, NLA3, NLB1, NLB2, NLB3, NLC1, NLC2, NLC3, NLD1, NLD2, and NLD3, the nozzle rows will be described as the nozzle rows NL in some cases.

The liquid ejecting head 10B has a plurality of head chips 12. The head chip 12 is provided with a nozzle plate in which the nozzle N is formed. The head chip 12 is provided with the nozzle row NL for ejecting one type of ink. The head chip 12 has a pressure chamber (not shown) and an actuator (not shown). As the actuator raises the pressure of the ink in the pressure chamber, the ink is ejected from the nozzle N.

The nozzle rows NLA1, NLA2, and NLA3 are disposed at positions different from each other in the X-axis direction. The nozzle rows NLA1 and NLA3 and the nozzle row NLA2 are disposed at positions different from each other in the Y-axis direction. The nozzle row NLA2 is positioned in the Y2 direction with respect to the nozzle rows NLA1 and NLA3. In the first posture P1 of the liquid ejecting head 10B, the nozzle row NLA2 is positioned above the nozzle rows NLA1 and NLA3 in the gravity direction G1. In the first posture P1, an ejection surface F2 is in a state of being inclined with respect to the horizontal plane.

Disposition of the nozzle rows NLB1, NLB2, and NLB3 is the same as the disposition of the nozzle rows NLA1, NLA2, and NLA3. The nozzle rows NLB1, NLB2, and NLB3 and the nozzle rows NLA1, NLA2, and NLA3 are spaced apart from each other in the Y-axis direction.

Disposition of the nozzle rows NLC1, NLC2, and NLC3 is the same as the disposition of the nozzle rows NLA1, NLA2, and NLA3. The nozzle rows NLC1, NLC2, and NLC3 are positioned between the nozzle rows NLA1, NLA2, and NLA3 and the nozzle rows NLB1, NLB2, and NLB3 in the Y-axis direction.

Disposition of the nozzle rows NLD1, NLD2, and NLD3 is the same as the disposition of the nozzle rows NLA1, NLA2, and NLA3. The nozzle rows NLD1, NLD2, and NLD3 are positioned between the nozzle rows NLC1, NLC2, and NLC3 and the nozzle rows NLB1, NLB2, and NLB3 in the Y-axis direction.

The liquid ejecting apparatus 1 may include the liquid ejecting head 10B instead of the liquid ejecting head 10. The liquid ejecting apparatus 1 including the liquid ejecting head 10B achieves the same operational effects as the liquid ejecting apparatus 1 including the liquid ejecting head 10.

Figure 14:
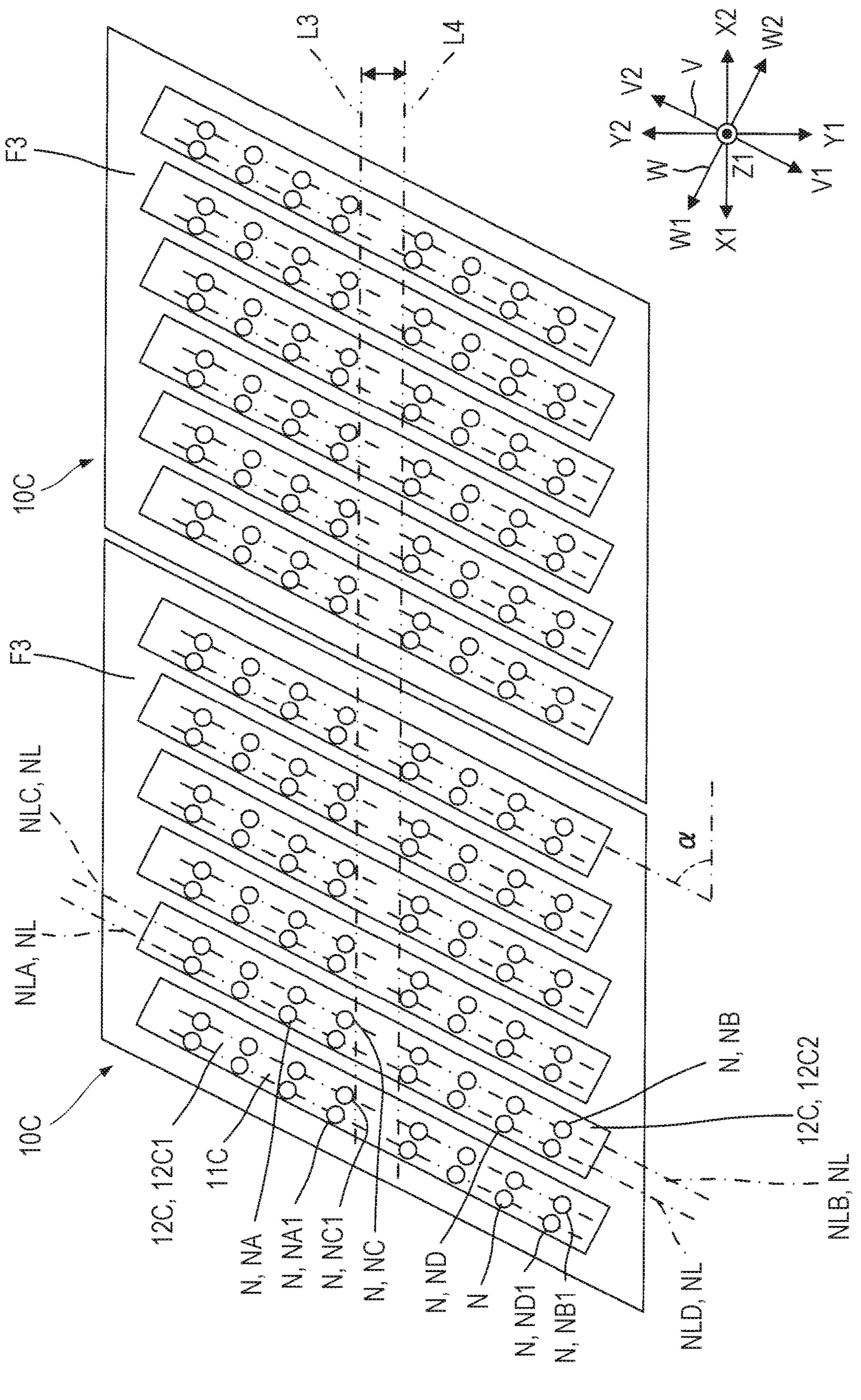
FIG. 14 is a bottom view showing an ejection surface of a liquid ejecting head according to modification example 2.

Next, disposition of the nozzle rows NL of a liquid ejecting head 10C according to modification example 2 will be described with reference to FIG. 14. FIG. 14 is a bottom view showing an ejection surface F3 of the liquid ejecting head 10C according to modification example 2. The liquid ejecting head 10C has the plurality of nozzle rows NL. The nozzle rows NL include the nozzle row NLA for ejecting the first ink, the nozzle row NLB for ejecting the second ink, the nozzle row NLC for ejecting the third ink, and the nozzle row NLD for ejecting the fourth ink. When not distinguishing between the nozzle rows NLA, NLB, NLC, and NLD, the nozzle rows will be described as the nozzle rows NL in some cases.

The liquid ejecting head 10C has a plurality of head chips 12C. The head chip 12C is provided with a nozzle plate 11C in which the nozzle N is formed. The head chip 12C is provided with each of the nozzle rows NLA, NLB, NLC, and NLD.

FIG. 14 shows a V-axis direction and a W-axis direction that are orthogonal to each other. The V-axis direction and the W-axis direction are orthogonal to the Z-axis direction. The V-axis direction and the W-axis direction are directions having the ejection surface F3 as reference. The V-axis direction includes a V1 direction and a V2 direction. The W-axis direction includes a W1 direction and a W2 direction. The V-axis direction intersects the X-axis direction at an inclination angle α.

The plurality of nozzle rows NL extend along the V-axis direction. The nozzles N included in the nozzle row NL are arranged in the V-axis direction. The nozzle row NLA and the nozzle row NLD are arranged in the V-axis direction. The nozzle row NLA and the nozzle row NLD are spaced apart from each other in the V-axis direction. The nozzle row NLA and the nozzle row NLD are spaced apart from each other in the Y-axis direction. In FIG. 14, imaginary lines L3 and L4 are shown by two-dot chain lines. The imaginary lines L3 and L4 are straight lines that are spaced apart from each other in the Y-axis direction and follow the X-axis direction. The imaginary line L3 is positioned in the Y2 direction with respect to the imaginary line L4. The nozzle rows NLA and NLC are positioned in the Y2 direction with respect to the imaginary line L3, and the nozzle rows NLB and NLD are positioned in the Y1 direction with respect to the imaginary line L4.

The nozzle row NLC and the nozzle row NLB are arranged in the V-axis direction. The nozzle row NLC and the nozzle row NLB are spaced apart from each other in the V-axis direction. The nozzle row NLC and the nozzle row NLB are spaced apart from each other in the Y-axis direction. In the liquid ejecting head 10C, the nozzle rows NLA and NLC are examples of the first nozzle row, and the nozzle rows NLD and NLB are examples of the second nozzle row.

When viewed in the Y-axis direction, the nozzle row NLA and the nozzle rows NLD and NLB at least partially overlap each other. For example, among two head chips 12C adjacent to each other in the X-axis direction, a head chip disposed in the X1 direction will be defined as a head chip 12C1, and a head chip disposed in the X2 direction with respect to the head chip 12C1 will be defined as a head chip 12C2. When viewed in the Y-axis direction, the nozzle row NLA of the head chip 12C1 and the nozzle rows NLD and NLB of the head chip 12C2 at least partially overlap each other. The nozzle row NLA and the nozzle rows NLD and NLB in the same head chip 12 may at least partially overlap each other in the Y-axis direction.

Similarly, when viewed in the Y-axis direction, the nozzle row NLC and the nozzle rows NLD and NLB at least partially overlap each other. When viewed in the Y-axis direction, the nozzle row NLC of the head chip 12C1 and the nozzle rows NLD and NLB of the head chip 12C2 at least partially overlap each other. The nozzle row NLC and the nozzle rows NLD and NLB in the same head chip 12 may at least partially overlap each other in the Y-axis direction.

When viewed in the X-axis direction, the nozzle row NLA and the nozzle rows NLD and NLB are disposed at intervals in the Y-axis direction. When viewed in the X-axis direction, the nozzle row NLC and the nozzle rows NLD and NLB are disposed at intervals in the Y-axis direction.

In the Y-axis direction, an interval between the nozzle row NLA and the nozzle row NLC that are provided in the same head chip 12C is narrower than an interval between the nozzle row NLC provided in the head chip 12C1 and the nozzle row NLA provided in the head chip 12C2.

A nozzle NA1 positioned at a lower end of the nozzle row NLA in the gravity direction G1 is positioned above a nozzle ND1 positioned at a lower end of the nozzle row NLD and a nozzle NB1 positioned at a lower end of the nozzle row NLB in the gravity direction G1.

A nozzle NC1 positioned at a lower end of the nozzle row NLC in the gravity direction G1 is positioned above the nozzle ND1 positioned at the lower end of the nozzle row NLD and the nozzle NB1 positioned at the lower end of the nozzle row NLB in the gravity direction G1.

The liquid ejecting apparatus 1 including such a liquid ejecting head 10C achieves the same operational effects as the liquid ejecting apparatus 1 including the liquid ejecting head 10.

When attachment of a satellite droplet to the nozzle N above as described above is considered as a problem in the liquid ejecting head 10C including the nozzle rows NL at least partially overlapping each other in the gravity direction G1, it is desirable to determine a height relationship between the nozzle rows NL at least partially overlapping each other by comparing the nozzles N positioned at the same position on the X-axis in an extending direction of an intersection line between the ejection surface F3 in the inclined posture of each nozzle row NL and the horizontal plane F0. This is because when the intersection line between the ejection surface F3 in the inclined posture and the horizontal plane F0 follows the X-axis, there is a high probability that a satellite droplet separated out from an ink ejected from the nozzle N rises to the same position as the nozzle N on the X-axis and is further attached to the nozzle N above. Herein, the X-axis along the extending direction of the intersection line between the ejection surface F3 in the inclined posture and the horizontal plane F0 is an example of "an imaginary axis along an extending direction of an intersection line between an ejection surface in the first posture and the horizontal plane"

In addition, a problem that a satellite droplet is attached to a nozzle row is likely to occur in the same head chip 12C. In the present modification example, in the same head chip 12C, the nozzle row NLA and the nozzle row NLC at least partially overlap each other in the gravity direction G1, and the nozzle row NLB and the nozzle row NLD at least partially overlap each other in the gravity direction G1.

Herein, when the nozzle NA of the nozzle row NLA and the nozzle NC of the nozzle row NLC that are positioned in the same head chip 12C and are at the same position on the X-axis are compared to each other, since the nozzle NA is positioned above the nozzle NC, it may be interpreted that the nozzle row NLA is a nozzle row above the nozzle row NLC. Similarly, when the nozzle ND of the nozzle row NLD and the nozzle NB of the nozzle row NLB that are positioned in the same head chip 12C and are at the same position on the X-axis are compared to each other, since the nozzle ND of the nozzle row NLD is positioned above the nozzle NB of the nozzle row NLB, the nozzle row NLD may be a nozzle row above the nozzle row NLB. As described above, the nozzle row NLA may be an example of the first nozzle row, the nozzle row NLB may be an example of the second nozzle row, the nozzle row NLC may be an example of the third nozzle row, and the nozzle row NLD may be an example of the fourth nozzle row.

Figure 15:
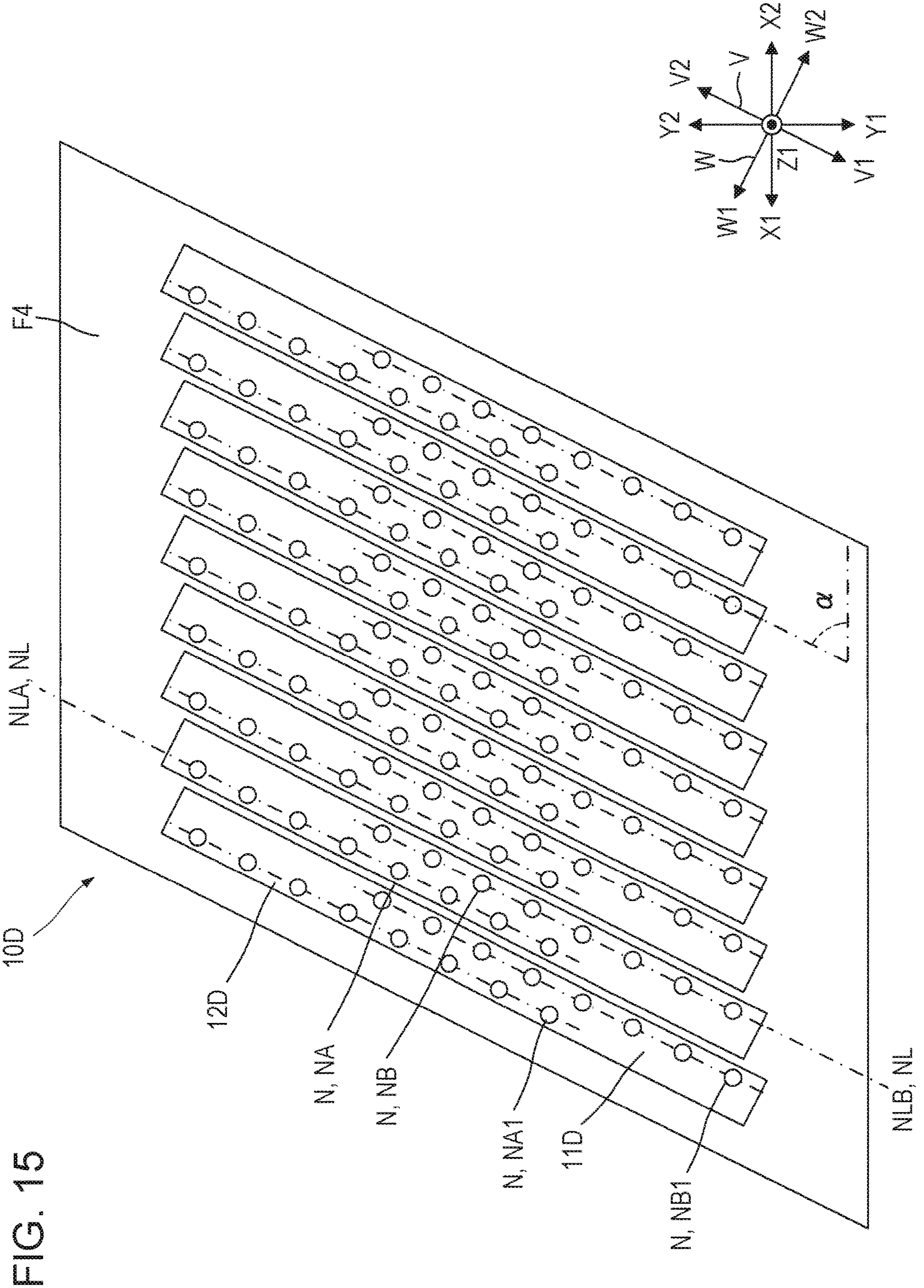
FIG. 15 is a bottom view showing an ejection surface of a liquid ejecting head according to modification example 3.

Next, disposition of the nozzle rows NL of a liquid ejecting head 10D according to modification example 3 will be described with reference to FIG. 15. FIG. 15 is a bottom view showing an ejection surface F4 of the liquid ejecting head 10D according to modification example 3. The liquid ejecting head 10D has the plurality of nozzle rows NL. The nozzle rows NL includes the nozzle row NLA for ejecting the first ink and the nozzle row NLB for ejecting the second ink. When not distinguishing between the nozzle rows NLA and NLB, the nozzle rows will be described as the nozzle rows NL in some cases.

The liquid ejecting head 10D has a plurality of head chips 12D. The head chip 12D is provided with a nozzle plate 11D in which the nozzle N is formed. The head chip 12D is provided with each of the nozzle rows NLA and NLB.

The plurality of nozzle rows NL extend along the V-axis direction. The nozzles N included in the nozzle row NL are arranged in the V-axis direction. The nozzle rows NLA and NLB are disposed at positions different from each other in the W-axis direction. When viewed in the W-axis direction, the nozzle rows NLA and NLB at least partially overlap each other. When viewed in the Y-axis direction, the nozzle row NLA and the nozzle row NLB at least partially overlap each other. When viewed in the X-axis direction, the nozzle row NLA and the nozzle row NLB at least partially overlap each other.

When viewed in the X-axis direction, the nozzle row NLA and the nozzle row NLB at least partially overlap each other, that is, the nozzle row NLA and the nozzle row NLB at least partially overlap each other in the gravity direction G1. The nozzle NA1 positioned at the lower end of the nozzle row NLA in the gravity direction G1 is positioned above the nozzle NB1 positioned at the lower end of the nozzle row NLB in the gravity direction G1.

In addition, when the nozzle NA of the nozzle row NLA and the nozzle NB of the nozzle row NLB that are positioned in the same head chip 12D and are at the same position on the X-axis are compared to each other, the nozzle NA of the nozzle row NLA is positioned above the nozzle NB of the nozzle row NLB. For this reason, when considering a problem that a satellite droplet separated out from ink droplets is attached to the nozzle N above, the nozzle row NLA may be an example of the first nozzle row, and the nozzle row NLB may be an example of the second nozzle row in the liquid ejecting head 10D, as in modification example 2 described above.

The liquid ejecting apparatus 1 including such a liquid ejecting head 10D achieves the same operational effects as the liquid ejecting apparatus 1 including the liquid ejecting head 10.

Figure 16:
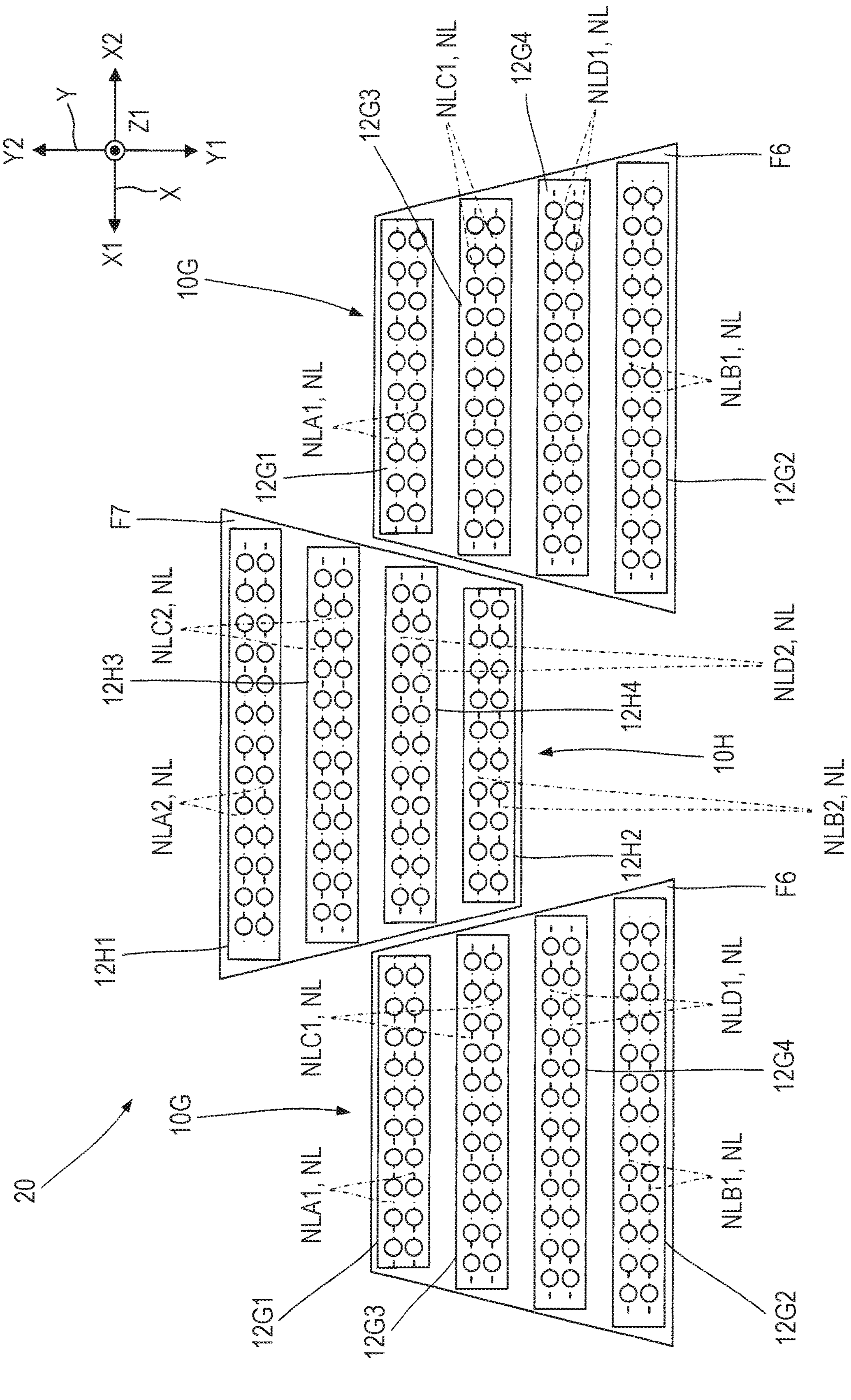
FIG. 16 is a bottom view showing an ejection surface of a liquid ejecting head according to modification example 4.

Next, disposition of the nozzle rows NL of liquid ejecting heads 10G and 10H according to modification example 4 will be described with reference to FIG. 16. FIG. 16 is a bottom view showing ejection surfaces of the liquid ejecting heads 10G and 10H according to modification example 4. The liquid ejecting apparatus 1 shown in FIG. 1 may include a head unit 20 having a plurality of liquid ejecting heads 10G and 10H instead of the liquid ejecting head 10. The head unit 20 has the plurality of liquid ejecting heads 10G and 10H alternately arranged in the X-axis direction. FIG. 16 shows the plurality of liquid ejecting heads 10G and the liquid ejecting head 10H disposed between the plurality of liquid ejecting heads 10G.

The liquid ejecting head 10G includes, as the plurality of nozzle rows NL, the nozzle row NLA1 for ejecting the first ink, the nozzle row NLB1 for ejecting the second ink, the nozzle row NLC1 for ejecting the third ink, and the nozzle row NLD1 for ejecting the fourth ink.

The liquid ejecting head 10G has a plurality of head chips 12G1, 12G2, 12G3, and 12G4. The head chip 12G1 is provided with the nozzle row NLA1, the head chip 12G2 is provided with the nozzle row NLB1, the head chip 12G3 is provided with the nozzle row NLC1, and the head chip 12G4 is provided with the nozzle row NLD1.

In the liquid ejecting head 10G, the nozzle row NLA1 is an example of the first nozzle row, the nozzle row NLB1 is an example of the second nozzle row, the nozzle row NLC1 is an example of the third nozzle row, and the nozzle row NLD1 is an example of the fourth nozzle row. The plurality of nozzle rows NLA1, NLB1, NLC1, and NLD1 extend in the X-axis direction. The nozzle row NLA1, the nozzle row NLC1, the nozzle row NLD1, and the nozzle row NLB1 are disposed in this order in the Y1 direction. The nozzle row NLB1 is longer than the nozzle row NLD1 regarding the X-axis direction. The nozzle row NLD1 is longer than the nozzle row NLC1 regarding the X-axis direction. The nozzle row NLC1 is longer than the nozzle row NLA1 regarding the X-axis direction. The nozzle row NLB1 is longer than the nozzle row NLA1 regarding the X-axis direction. In an inclined posture of the head unit 20, the nozzle row NLA1 is disposed at a position higher than the nozzle row NLC1, the nozzle row NLC1 is disposed at a position higher than the nozzle row NLD1, and the nozzle row NLD1 is disposed at a position higher than the nozzle row NLB1.

The liquid ejecting head 10H includes, as the plurality of nozzle rows NL, the nozzle row NLA2 for ejecting the first ink, the nozzle row NLB2 for ejecting the second ink, the nozzle row NLC2 for ejecting the third ink, and the nozzle row NLD2 for ejecting the fourth ink.

The liquid ejecting head 10H has a plurality of head chips 12H1, 12H2, 12H3, and 12H4. The head chip 12H1 is provided with the nozzle row NLA2, the head chip 12H2 is provided with the nozzle row NLB2, the head chip 12H3 is provided with the nozzle row NLC2, and the head chip 12H4 is provided with the nozzle row NLD2.

In the liquid ejecting head 10H, the nozzle row NLA2 is an example of the first nozzle row, the nozzle row NLB2 is an example of the second nozzle row, the nozzle row NLC2 is an example of the third nozzle row, and the nozzle row NLD2 is an example of the fourth nozzle row. The plurality of nozzle rows NLA2, NLB2, NLC2, and NLD2 extend in the X-axis direction. The nozzle row NLA2, the nozzle row NLC2, the nozzle row NLD2, and the nozzle row NLB2 are disposed in this order in the Y1 direction. The nozzle row NLA2 is longer than the nozzle row NLC2 regarding the X-axis direction. The nozzle row NLC2 is longer than the nozzle row NLD2 regarding the X-axis direction. The nozzle row NLD2 is longer than the nozzle row NLB2 regarding the X-axis direction. The nozzle row NLA2 is longer than the nozzle row NLB2 regarding the X-axis direction. In the inclined posture of the head unit 20, the nozzle row NLA2 is disposed at a position higher than the nozzle row NLC2, the nozzle row NLC2 is disposed at a position higher than the nozzle row NLD2, and the nozzle row NLD2 is disposed at a position higher than the nozzle row NLB2.

The liquid ejecting apparatus 1 including such liquid ejecting heads 10G and 10H achieves the same operational effects as the liquid ejecting apparatus 1 including the liquid ejecting head 10.

Figure 17:
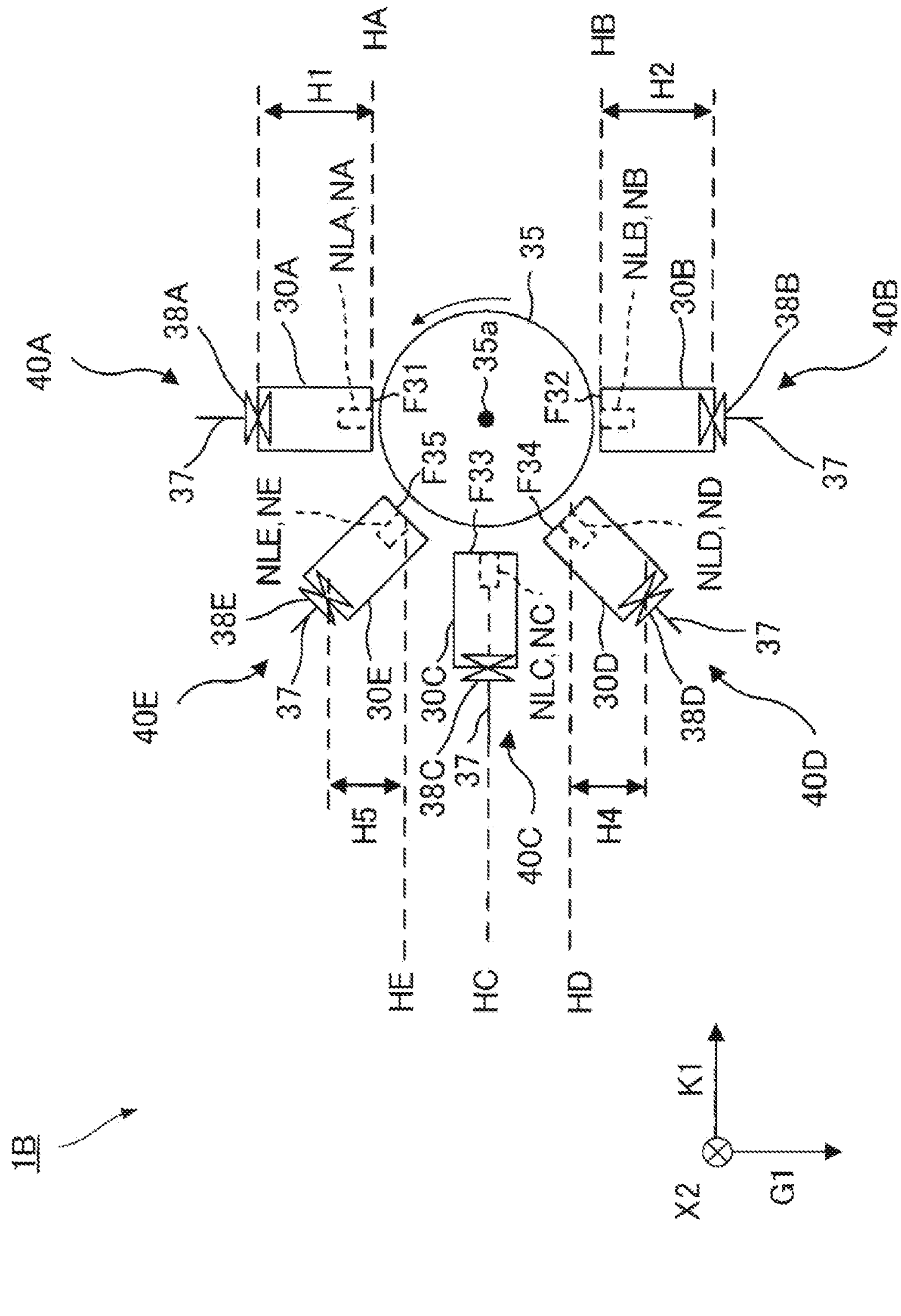
FIG. 17 is a schematic view showing a liquid ejecting apparatus according to a second embodiment.

Next, a liquid ejecting apparatus 1B according to a second embodiment will be described with reference to FIG. 17. FIG. 17 is a schematic view showing the liquid ejecting apparatus 1B according to the second embodiment. The liquid ejecting apparatus 1B includes a plurality of liquid ejecting heads 30A to 30E, a drum 35 that transports the medium PA, and pressure adjusting portions 38A to 38E. In the description of the second embodiment, the same description as in the first embodiment will be omitted. The X-axis direction, the Y-axis direction, and the Z-axis direction, which are shown in each drawing, differ according to the postures of the liquid ejecting heads 30A to 30E. The drum 35 may be an intermediate transfer body on which an ink ejected from the liquid ejecting heads 30A to 30E lands.

The drum 35 rotates around a rotation shaft 35*a* extending in the X-axis direction. The medium PA is transported with the rotation of the drum 35. The medium PA passes through positions corresponding to the liquid ejecting heads 30A to 30E. An ink is ejected from the liquid ejecting heads 30A to 30E to the moving medium PA.

The plurality of liquid ejecting heads 30A to 30E are disposed at positions different from each other in a circumferential direction of the drum 35. Ejection surfaces F31 to F35 of the liquid ejecting heads 30A to 30E are disposed at angles different from each other. The ejection surfaces F31 to F35 are surfaces of nozzle plates. The liquid ejecting heads 30A to 30E have a common structure.

Figure 18:
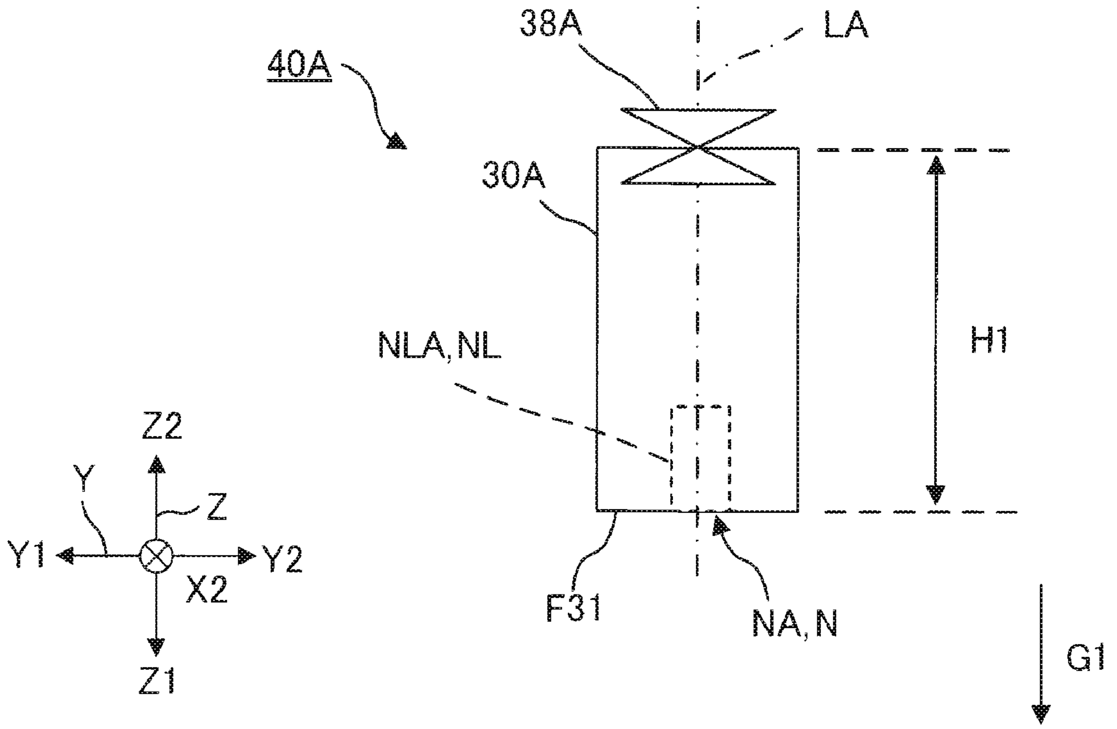
FIG. 18 is a schematic view showing disposition of the liquid ejecting head.

FIG. 18 is a schematic view showing the posture of the liquid ejecting head 30A. The liquid ejecting head 30A has the nozzle row NLA for ejecting the first ink. The nozzle row NLA is formed on the ejection surface F31 of the liquid ejecting head 30A. The plurality of nozzles NA included in the nozzle row NLA are arranged in the X-axis direction. An LA direction perpendicular to the ejection surface F31 follows the gravity direction G1. An ink ejected from the nozzles NA of the liquid ejecting head 30A flies downward along the gravity direction G1.

Figure 19:
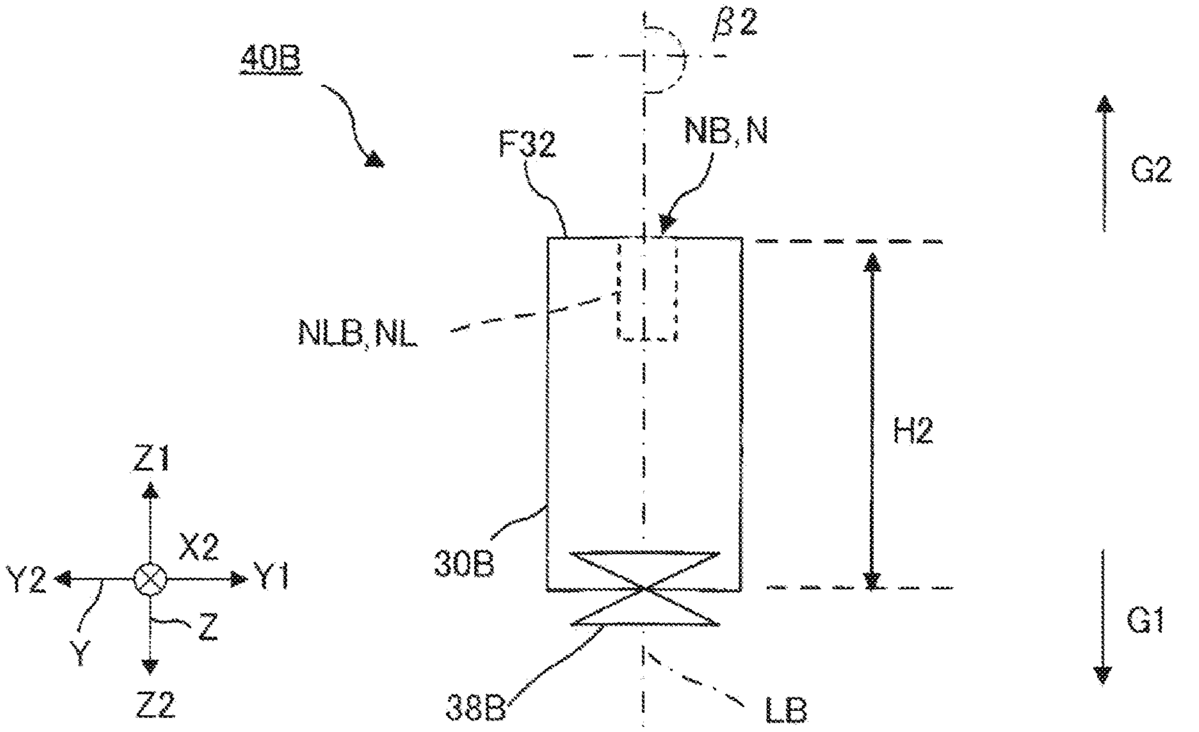
FIG. 19 is a schematic view showing disposition of the liquid ejecting head.

FIG. 19 is a schematic view showing the posture of the liquid ejecting head 30B. The liquid ejecting head 30B has the nozzle row NLB for ejecting the second ink. The nozzle row NLB is formed on the ejection surface F32 of the liquid ejecting head 30B. The plurality of nozzles NB included in the nozzle row NLB are arranged in the X-axis direction. An LB direction perpendicular to the ejection surface F32 follows the gravity direction G1. FIG. 19 shows the upward direction G2 that is an opposite direction to the gravity direction G1. An ink ejected from the nozzles NB of the liquid ejecting head 30B flies in the upward direction G2.

The liquid ejecting head 30A is an example of a first liquid ejecting head, and the liquid ejecting head 30B is an example of a second liquid ejecting head. The ejection surface F31 is an example of a first ejection surface, and the ejection surface F32 is an example of a second ejection surface. The nozzle NA is an example of a first nozzle that ejects the first ink, and the nozzle NB is an example of a second nozzle that ejects the second ink. The dynamic surface tension of the first ink is lower than the dynamic surface tension of the second ink.

In the liquid ejecting head 30A shown in FIG. 18, an angle β1 formed by an ejection direction of the first ink ejected from the nozzle row NLA and the gravity direction G1 is 0 degree. The angle β1 is an example of a first angle. In the liquid ejecting head 30B shown in FIG. 19, an angle β2 formed by an ejection direction of the second ink ejected from the nozzle row NLB and the gravity direction G1 is 180 degrees. The angle β2 is an example of a second angle. The angle β2 is an angle larger than the angle β1.

Figure 20:
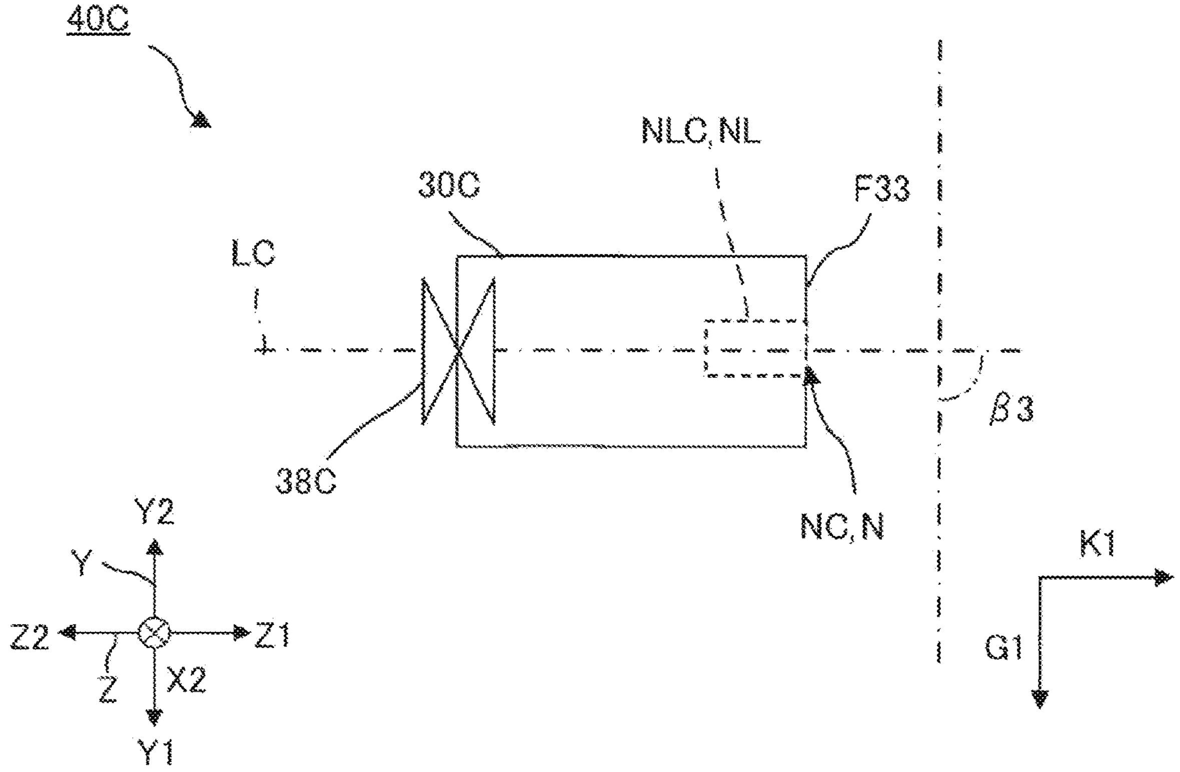
FIG. 20 is a schematic view showing disposition of the liquid ejecting head.

FIG. 20 is a schematic view showing the posture of the liquid ejecting head 30C. The liquid ejecting head 30C has the nozzle row NLC for ejecting the third ink. The nozzle row NLC is formed on the ejection surface F33 of the liquid ejecting head 30C. The plurality of nozzles NC included in the nozzle row NLC are arranged in the X-axis direction. An LC direction perpendicular to the ejection surface F33 follows the K1 direction orthogonal to the gravity direction G1. FIG. 20 shows the K1 direction orthogonal to the gravity direction G1. An ink ejected from the nozzles NC of the liquid ejecting head 30C flies along the K1 direction orthogonal to the gravity direction G1.

The liquid ejecting head 30C is an example of a third liquid ejecting head. The ejection surface F33 is an example of a third ejection surface. The nozzle NC is an example of a third nozzle that ejects the third ink. The dynamic surface tension of the third ink is higher than the dynamic surface tension of the first ink and is lower than the dynamic surface tension of the second ink.

An angle β3 formed by the K1 direction, which is an ejection direction of the third ink ejected from the nozzle NC, and the gravity direction G1 is 90 degrees. The angle 133 is an example of a third angle. The angle β3 is an angle larger than the angle β1 and is an angle smaller than the angle β2.

Figure 21:
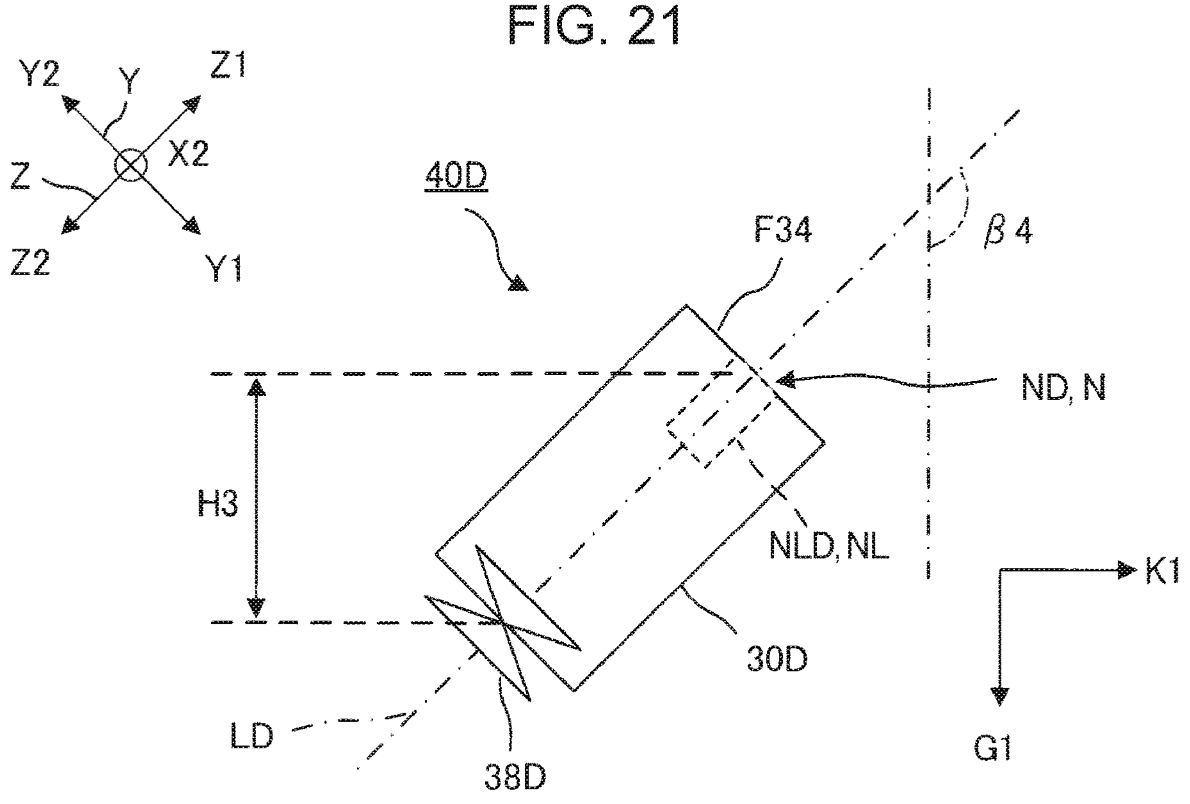
FIG. 21 is a schematic view showing disposition of the liquid ejecting head.

FIG. 21 is a schematic view showing the posture of the liquid ejecting head 30D. The liquid ejecting head 30D has the nozzle row NLD for ejecting the fourth ink. The nozzle row NLD is formed on the ejection surface F34 of the liquid ejecting head 30D. The plurality of nozzles ND included in the nozzle row NLD are arranged in the X-axis direction. An LD direction perpendicular to the ejection surface F34 follows the Z1 direction intersecting the gravity direction G1 and the K-axis direction. FIG. 21 shows the Z1 direction intersecting the gravity direction G1. An ink ejected from the nozzles ND of the liquid ejecting head 30D flies obliquely upward along the Z1 direction intersecting the gravity direction G1.

The liquid ejecting head 30D is an example of a fourth liquid ejecting head. The ejection surface F34 is an example of a fourth ejection surface. The nozzle ND is an example of a fourth nozzle that ejects the fourth ink. The dynamic surface tension of the fourth ink is higher than the dynamic surface tension of the third ink and is lower than the dynamic surface tension of the second ink.

An angle β4 formed by an ejection direction of the fourth ink ejected from the nozzle ND, which is the Z1 direction in FIG. 21, and the gravity direction G1 is 135 degrees. The angle β4 is an example of a fourth angle. The angle β4 is an angle larger than the angle β3 and is an angle smaller than the angle β2.

Figure 22:
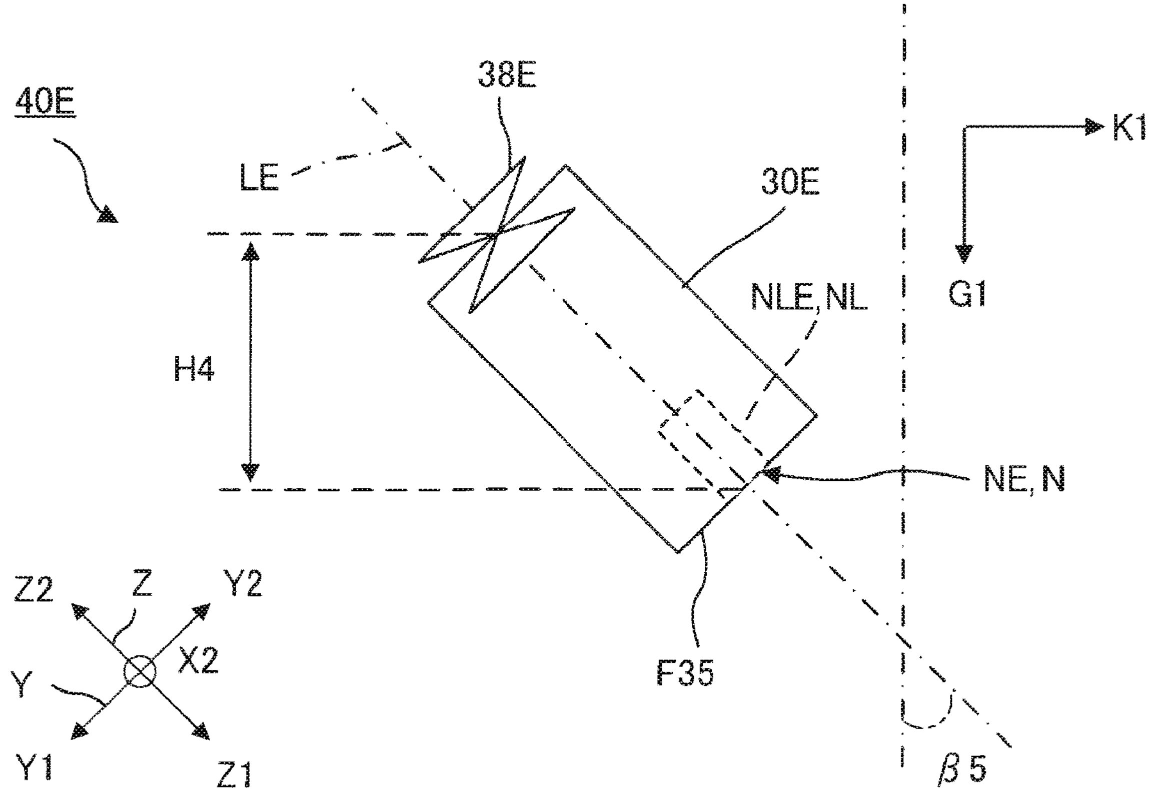
FIG. 22 is a schematic view showing disposition of the liquid ejecting head.

FIG. 22 is a schematic view showing the posture of the liquid ejecting head 30E. The liquid ejecting head 30E has the nozzle row NLE for ejecting a fifth ink. The nozzle row NLE is formed on the ejection surface F35 of the liquid ejecting head 30E. The plurality of nozzles NE included in the nozzle row NLE are arranged in the X-axis direction. An LE direction perpendicular to the ejection surface F35 follows a direction intersecting the gravity direction G1 and the K-axis direction. FIG. 22 shows the K1 direction intersecting the gravity direction G1. An ink ejected from the nozzles NE of the liquid ejecting head 30E flies in the direction intersecting the gravity direction G1 and the K-axis direction, that is, obliquely downward along the Z1 direction in FIG. 22.

The liquid ejecting head 30E is an example of a fifth liquid ejecting head. The ejection surface F35 is an example of a fifth ejection surface. The nozzle NE is an example of a fifth nozzle that ejects the fifth ink. The dynamic surface tension of the fifth ink is higher than the dynamic surface tension of the first ink and is lower than the dynamic surface tension of the third ink.

An angle β5 formed by an ejection direction of the fifth ink ejected from the nozzle NE, which is the Z1 direction in FIG. 22, and the gravity direction G1 is 45 degrees. The angle β5 is an example of a fifth angle. The angle β5 is an angle larger than the angle β1 and is an angle smaller than the angle β3.

Next, water head differences H1 to H5 of the nozzle rows NLA to NLE will be described with reference to FIG. 17. The liquid ejecting head 30A is provided with the pressure adjusting portion 38A. The liquid ejecting head 30B is provided with the pressure adjusting portion 38B. The liquid ejecting head 30C is provided with the pressure adjusting portion 38C. The liquid ejecting head 30D is provided with the pressure adjusting portion 38D. The liquid ejecting head 30E is provided with the pressure adjusting portion 38E. The pressure adjusting portion 38A is coupled to the nozzle row NLA. The pressure adjusting portion 38B is coupled to the nozzle row NLB. The pressure adjusting portion 38C is coupled to the nozzle row NLC. The pressure adjusting portion 38D is coupled to the nozzle row NLD. The pressure adjusting portion 38E is coupled to the nozzle row NLE.

The pressure adjusting portions 38A to 38E adjust the pressures of inks to be supplied to the liquid ejecting heads 30A to 30E such that predetermined pressures act on the nozzles NA to NE. The pressure adjusting portions 38A to 38E each are, for example, a negative pressure generating portion including a pressure adjusting valve. The negative pressure generating portion may be configured, for example, to have the pressure adjusting valve that opens/closes the ink flow path and a flexible member that bends based on a differential pressure between the pressure of the ink flow path downstream of the pressure adjusting valve and the atmospheric pressure and to control the opening/closing of the pressure adjusting valve such that a negative pressure in a predetermined range acts on the nozzle N as the pressure adjusting valve is moved because of the bending of the flexible member. The pressure adjusting portions 38A to 38E have a common structure.

In addition, the pressure adjusting portions 38A to 38E may each adjust the pressure of an ink to be supplied to each of the liquid ejecting heads 30A to 30E with a sub-tank that temporarily stores the ink. Specifically, the pressure adjusting portions 38A to 38E may each have the sub-tank and any sensor that can detect a stored amount of an ink in the sub-tank and adjust the pressure of an ink in each of the liquid ejecting heads 30A to 30E by a water head difference between a liquid surface in the sub-tank and each of the liquid ejecting heads 30A to 30E by keeping the stored amount of the ink in the sub-tank substantially constant, that is, keeping the liquid surface of the ink stored in the sub-tank substantially constant as the ink is refilled from the liquid containers 2 once the stored amount of the ink in the sub-tank detected by the sensor has become smaller than a threshold. In addition, the pressure of the ink to be supplied to each of the liquid ejecting heads 30A to 30E may be adjusted by setting a pressure in the sub-tank to a predetermined pressure with a compressor.

The pressure adjusting portion 38A adjusts the pressure of the first ink. The pressure adjusting portion 38B adjusts the pressure of the second ink. The pressure adjusting portion 38C adjusts the pressure of the third ink. The pressure adjusting portion 38D adjusts the pressure of the fourth ink. The pressure adjusting portion 38E adjusts the pressure of the fifth ink. Head units 40A to 40E include the pressure adjusting portions 38A to 38E and the liquid ejecting heads 30A to 30E.

As described above, the liquid ejecting heads 30A to 30E have a common structure, and the pressure adjusting portions 38A to 38E have a common structure. For this reason, the head unit 40A, the head unit 40B, the head unit 40C, the head unit 40D, and the head unit 40E have a common structure. Therefore, a resistance in the flow path of an ink in each of the liquid ejecting heads 30A to 30E is the same. Specifically, a flow path resistance from the pressure adjusting portion 38A to the nozzle NA of the nozzle row NLA is the same as a flow path resistance from the pressure adjusting portion 38B to the nozzle NB of the nozzle row NLB.

Similarly, the flow path resistance from the pressure adjusting portion 38A to the nozzle NA of the nozzle row NLA is the same as a flow path resistance from the pressure adjusting portion 38C to the nozzle NC of the nozzle row NLC. The flow path resistance from the pressure adjusting portion 38A to the nozzle NA of the nozzle row NLA is the same as a flow path resistance from the pressure adjusting portion 38D to the nozzle ND of the nozzle row NLD. The flow path resistance from the pressure adjusting portion 38A to the nozzle NA of the nozzle row NLA is the same as a flow path resistance from the pressure adjusting portion 38E to the nozzle NE of the nozzle row NLE.

In addition, the liquid ejecting apparatus 1B includes a support portion supporting the head units 40A to 40E. The support portion is not shown. The support portion may have any structure insofar as the support portion can support the head units 40A to 40E. The support portion may support the head units 40A to 40E separately or may support the head units 40A to 40E altogether.

The liquid ejecting head 30A having the ejection surface F31 and the pressure adjusting portion 38A can be attached/detached with respect to the support portion while being integrated therewith. Similarly, the liquid ejecting heads 30B to 30E having the ejection surfaces F32 to F35 and the pressure adjusting portions 38B to 38E can be attached/detached with respect to the support portion while being integrated therewith.

In addition, since the head units 40A to 40E have the same structure, a relative positional relationship between the ejection surface F31 and the pressure adjusting portion 38A, a relative positional relationship between the ejection surface F32 and the pressure adjusting portion 38B, a relative positional relationship between the ejection surface F33 and the pressure adjusting portion 38C, a relative positional relationship between the ejection surface F34 and the pressure adjusting portion 38D, and a relative positional relationship between the ejection surface F35 and the pressure adjusting portion 38E are all the same.

FIG. 17 shows the height positions HA, HB, HC, HD, and HE of the nozzle rows NLA, NLB, NLC, NLD, and NLE. The height position HA is disposed at a position higher than the height position HE. The height position HE is disposed at a position higher than the height position HC. The height position HC is disposed at a position higher than the height position HD. The height position HD is disposed at a position higher than the height position HB. The pressure adjusting portion 38A is positioned above the height position HA. The pressure adjusting portion 38B is positioned below the height position HB. The pressure adjusting portion 38C is at the same height as the height position HC. The pressure adjusting portion 38D is positioned below the height position HD. The pressure adjusting portion 38E is positioned above the height position HE.

The water head difference H1 between the pressure adjusting portion 38A and the nozzle row NLA is larger than the water head difference H5 between the pressure adjusting portion 38E and the nozzle row NLE. The water head difference H5 is larger than the water head difference H3 between the pressure adjusting portion 38C and the nozzle row NLC. The water head difference H3 is not shown. The water head difference H3 is larger than the water head difference H4 between the pressure adjusting portion 38D and the nozzle row NLD. The water head difference H4 is larger than the water head difference H2 between the pressure adjusting portion 38B and the nozzle row NLB.

The water head differences H1 to H5 of the present specification have the nozzle row NL of each of the liquid ejecting heads 30A to 30E as reference. When the pressure adjusting portions 38A to 38E are positioned in the upward direction G2 with respect to the nozzle rows NL, the water head differences H1 to H5 have positive values. When the pressure adjusting portions 38A to 38E are positioned in the gravity direction G1 with respect to the nozzle rows NL, the water head differences H1 to H5 have negative values. Under the precondition, the water head difference H1 is larger than the water head difference H5, the water head difference H5 is larger than the water head difference H3, the water head difference H3 is larger than the water head difference H4, and the water head difference H4 is larger than the water head difference H2.

Even such a liquid ejecting apparatus 1B according to the second embodiment achieves the same operational effects as the liquid ejecting apparatus 1 of the first embodiment.

In the liquid ejecting apparatus 1B, positions of the nozzle rows NLA, NLB, NLC, NLD, and NLE are different according to the dynamic surface tension of an ink. The nozzle row NLA for ejecting the first ink having the lowest dynamic surface tension is disposed at a position higher than the other nozzle rows NLB, NLC, NLD, and NLE in the gravity direction G1. The first ink having the lowest dynamic surface tension is supplied to the nozzle row NLA having a larger water head difference H1.

In the liquid ejecting apparatus 1B, the nozzle row NLB for ejecting the second ink having the highest dynamic surface tension is disposed at a position lower than the other nozzle rows NLA, NLC, NLD, and NLE in the gravity direction G1. The second ink having the highest dynamic surface tension is supplied to the nozzle row NLB having a smaller water head difference H2.

In the liquid ejecting apparatus 1B, since the nozzle NA of the nozzle row NLA for ejecting the first ink having a higher dynamic surface tension is positioned above the nozzle NB of the nozzle row NLB for ejecting the second ink having a lower dynamic surface tension in the gravity direction G1, variations in supply characteristics of an ink to the plurality of nozzle rows NL for ejecting different types of inks can be reduced, and variations in ejection characteristics of an ink in the plurality of nozzle rows NL can be suppressed. As a result, the printing accuracy of the liquid ejecting apparatus 1B can be improved.

In the liquid ejecting apparatus 1B, the nozzle NC of the nozzle row NLC for ejecting the third ink is positioned between the nozzle NA of the nozzle row NLA and the nozzle NB of the nozzle row NLB in the gravity direction G1. The third ink having a dynamic surface tension higher than the first ink is supplied to the nozzle NC of the nozzle row NLC having the water head difference H3 smaller than the water head difference H1. The third ink having a dynamic surface tension lower than the second ink is supplied to the nozzle row NLC having the water head difference H3 larger than the water head difference H2.

In the liquid ejecting apparatus 1B, the nozzle ND of the nozzle row NLD for ejecting the fourth ink is positioned between the nozzle NC of the nozzle row NLC and the nozzle NB of the nozzle row NLB in the gravity direction G1. The fourth ink having a dynamic surface tension higher than the third ink is supplied to the nozzle ND of the nozzle row NLD having the water head difference H4 smaller than the water head difference H3. The fourth ink having a dynamic surface tension lower than the second ink is supplied to the nozzle ND of the nozzle row NLD having the water head difference H4 larger than the water head difference H2.

In the liquid ejecting apparatus 1B, the nozzle NE of the nozzle row NLE for ejecting the fifth ink is positioned between the nozzle NA of the nozzle row NLA and the nozzle NC of the nozzle row NLC in the gravity direction G1. The fifth ink having a dynamic surface tension higher than the first ink is supplied to the nozzle row NLE having the water head difference H5 smaller than the water head difference H1. The fifth ink having a dynamic surface tension lower than the third ink is supplied to the nozzle NE of the nozzle row NLE having the water head difference H5 larger than the water head difference H3.

Since the height positions of the nozzles NA to NE are different from each other according to the dynamic surface tension of an ink in such a liquid ejecting apparatus 1B, variations in supply characteristics of an ink to the plurality of nozzles NA to NE for ejecting different types of inks can be reduced, and variations in ejection characteristics of an ink in the plurality of nozzles NA to NE can be suppressed. As a result, the printing accuracy of the liquid ejecting apparatus 1B can be improved.

The embodiments described above are merely representative forms of the present disclosure. The present disclosure is not limited to the embodiments described above, and various changes and additions are possible without departing from the gist of the present disclosure.

Although a plurality of inks having colors different from each other are given as examples in the embodiments described above, the inks are not limited thereto. For example, the first ink and the second ink may have dynamic surface tensions different from each other and may have the same color.

Although the line type liquid ejecting apparatus 1 including a line head is given as an example in the embodiments described above, the present disclosure may also be applied to a serial type liquid ejecting apparatus in which a carriage, on which the liquid ejecting head 10 is mounted, is reciprocated in the width direction of the medium PA.

The liquid ejecting apparatus 1 that is given as an example in the embodiments described above can be adopted in various types of devices such as a facsimile device and a copier in addition to a device dedicated to printing. However, the application of the liquid ejecting apparatus of the embodiments of the present disclosure is not limited to printing. For example, a liquid ejecting apparatus that discharges a color material solution is used as a manufacturing device that forms a color filter of a display device such as a liquid crystal display panel. In addition, a liquid ejecting apparatus that discharges a conductive material solution is used as a manufacturing device that forms wiring and an electrode of a wiring substrate. In addition, a liquid ejecting apparatus that discharges an organic substance solution related to a living body is used, for example, as a manufacturing device that manufactures a biochip.

What is claimed is:

1. A liquid ejecting apparatus comprising:

a liquid ejecting head that has an ejection surface including a first nozzle row configured to eject a first ink, a second nozzle row configured to eject a second ink, and a third nozzle row configured to eject a third ink, wherein the liquid ejecting head is configured to be held in a first posture in which the ejection surface is inclined with respect to a horizontal plane, a dynamic surface tension of the second ink is higher than a dynamic surface tension of the first ink, a dynamic surface tension of the third ink is higher than the dynamic surface tension of the first ink and is lower than the dynamic surface tension of the second ink, in the first posture, the first nozzle row is positioned above the second nozzle row with respect to a gravity direction, and in the first posture, the third nozzle row is positioned below the first nozzle row and above the second nozzle row with respect to the gravity direction.

2. The liquid ejecting apparatus according to claim 1, wherein a difference between the dynamic surface tension of the first ink and the dynamic surface tension of the second ink is 1.0 mN/m or larger.

3. The liquid ejecting apparatus according to claim 1, wherein a dynamic surface tension of the second ink at a lifetime of 10 msec is higher than a dynamic surface tension of the first ink at a lifetime of 10 msec.

4. The liquid ejecting apparatus according to claim 1, wherein the first nozzle row and the second nozzle row are formed on a common nozzle plate.

5. The liquid ejecting apparatus according to claim 4, wherein in a case where a direction in which an intersection line between the ejection surface in the first posture and the horizontal plane extends is defined as a first direction and a direction orthogonal to the first direction in the ejection surface is defined as a second direction, the first nozzle row and the second nozzle row at least partially overlap each other when viewed in the second direction.

6. The liquid ejecting apparatus according to claim 1, wherein a direction in which an intersection line between the ejection surface in the first posture and the horizontal plane extends is defined as a first direction, and the first nozzle row and the second nozzle row are disposed at an interval when viewed in the first direction.

7. The liquid ejecting apparatus according to claim 1, wherein the first nozzle row includes a first specific nozzle positioned at a specific position on an imaginary axis along an extending direction of an intersection line between the ejection surface in the first posture and the horizontal plane, the second nozzle row includes a second specific nozzle positioned at the specific position on the imaginary axis, and the first specific nozzle is positioned above the second specific nozzle with respect to the gravity direction.

8. The liquid ejecting apparatus according to claim 1, wherein the ejection surface further includes a fourth nozzle row configured to eject a fourth ink, a dynamic surface tension of the fourth ink is lower than the dynamic surface tension of the second ink and is higher than the dynamic surface tension of the third ink, and in the first posture, the fourth nozzle row is positioned below the third nozzle row and above the second nozzle row with respect to the gravity direction.

9. The liquid ejecting apparatus according to claim 1, wherein a posture of the liquid ejecting head is configured to be changed to a plurality of postures including the first posture and a second posture different from the first posture, the liquid ejecting head is configured to rotate around a rotation shaft along a first direction which is an extending direction of an intersection line between the ejection surface in the first posture and the horizontal plane, and in a case where a line that passes through a center between the first nozzle row and the second nozzle row in the first posture and extends in a direction perpendicular to the ejection surface in the first posture when viewed in the first direction is defined as a first imaginary line, the rotation shaft is positioned on a first nozzle row side when viewed from the first imaginary line.

10. The liquid ejecting apparatus according to claim 9, wherein the first posture is a recording posture in which a recording operation is performed by ejecting the first ink and the second ink to a medium, and the second posture is a maintenance posture in which maintenance of the liquid ejecting head is performed.

11. The liquid ejecting apparatus according to claim 9, wherein in the second posture, the ejection surface is parallel to the horizontal plane.

12. The liquid ejecting apparatus according to claim 1, further comprising:

a housing that accommodates the liquid ejecting head, wherein the housing has a first contact point that is a portion which is in contact with a floor surface in a state where the housing is mounted on the floor surface when viewed in a first direction, which is an extending direction of an intersection line between the ejection surface in the first posture and the horizontal plane, and that is positioned at one end in a third direction orthogonal to both of the first direction and the gravity direction when viewed in the first direction, and in the first posture, a distance between the first contact point and the second nozzle row is larger than a distance between the first contact point and the first nozzle row.

13. The liquid ejecting apparatus according to claim 12, wherein the housing has a second contact point that is the portion which is in contact with the floor surface in a state of being mounted on the floor surface when viewed in the first direction and that is positioned at the other end in the third direction, and when viewed in the first direction, a center of gravity of the liquid ejecting apparatus is closer to the first contact point than to the second contact point with respect to the third direction.

14. The liquid ejecting apparatus according to claim 1, wherein in a state of the first posture, a cleaning operation of discharging the first ink from the first nozzle row to the ejection surface and discharging the second ink from the second nozzle row to the ejection surface is performed.

15. The liquid ejecting apparatus according to claim 1, wherein a difference between the dynamic surface tension of the first ink and the dynamic surface tension of the third ink is 1.0 mN/m or larger, and a difference between the dynamic surface tension of the third ink and the dynamic surface tension of the second ink is 1.0 mN/m or larger.

16. A liquid ejecting apparatus comprising:

a first liquid ejecting head that has a first ejection surface including a first nozzle configured to eject a first ink; and a second liquid ejecting head that has a second ejection surface including a second nozzle configured to eject a second ink and that is different from the first liquid ejecting head, wherein a dynamic surface tension of the second ink is higher than a dynamic surface tension of the first ink, the first ejection surface is disposed such that an angle formed by an ejection direction of the first ink ejected from the first nozzle to a medium and a gravity direction is a first angle, and the second ejection surface is disposed such that an angle formed by an ejection direction of the second ink ejected from the second nozzle to the medium and the gravity direction is a second angle larger than the first angle.

17. The liquid ejecting apparatus according to claim 16, further comprising:

a first pressure adjusting portion that adjusts a pressure of the first ink to be supplied to the first nozzle; and a second pressure adjusting portion that adjusts a pressure of the second ink to be supplied to the second nozzle, wherein a relative position of the first pressure adjusting portion with respect to the first ejection surface is the same as a relative position of the second pressure adjusting portion with respect to the second ejection surface.

18. A liquid ejecting head comprising:

a first nozzle row configured to eject a first ink;

a second nozzle row configured to eject a second ink; and a third nozzle row configured to eject a third ink, wherein a dynamic surface tension of the third ink is higher than a dynamic surface tension of the first ink and is lower than a dynamic surface tension of the second ink, and a difference between the dynamic surface tension of the first ink and the dynamic surface tension of the third ink is 1.0 mN/m or larger, a difference between the dynamic surface tension of the third ink and the dynamic surface tension of the second ink is 1.0 mN/m or larger, and the third nozzle row is positioned between the first nozzle row and the second nozzle row.

19. The liquid ejecting apparatus according to claim 18, wherein the ejection surface further includes a fourth nozzle row configured to eject a fourth ink, a dynamic surface tension of the fourth ink is lower than the dynamic surface tension of the second ink and is higher than the dynamic surface tension of the third ink, and the fourth nozzle row is positioned the third nozzle row and the second nozzle row.

* * * * *